US011995555B1

(12) United States Patent
Drimbarean et al.

(10) Patent No.: US 11,995,555 B1
(45) Date of Patent: May 28, 2024

(54) TRAINING A NEURAL NETWORK WITH QUANTIZED WEIGHTS

(71) Applicant: Perceive Corporation, San Jose, CA (US)

(72) Inventors: Alexandru F. Drimbarean, Galway (IE); Steven L. Teig, Menlo Park, CA (US)

(73) Assignee: PERCEIVE CORPORATION, San Jose, CA (US)

( * ) Notice: Subject to any disclaimer, the term of this patent is extended or adjusted under 35 U.S.C. 154(b) by 907 days.

(21) Appl. No.: 16/923,001

(22) Filed: Jul. 7, 2020

Related U.S. Application Data

(60) Provisional application No. 62/955,349, filed on Dec. 30, 2019, provisional application No. 62/949,082, filed on Dec. 17, 2019.

(51) Int. Cl.
| | |
|---|---|
| G06N 3/084 | (2023.01) |
| G06F 17/16 | (2006.01) |
| G06F 18/2113 | (2023.01) |
| G06N 3/048 | (2023.01) |
| G06N 5/046 | (2023.01) |
| G06N 20/00 | (2019.01) |

(52) U.S. Cl.
CPC .............. *G06N 3/084* (2013.01); *G06F 17/16* (2013.01); *G06F 18/2113* (2023.01); *G06N 3/048* (2023.01); *G06N 5/046* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 11,410,076 | B1 * | 8/2022 | Huszar | ............... G06F 17/11 |
| 11,468,313 | B1 * | 10/2022 | Naumov | ............. G06N 10/00 |
| 2016/0086078 | A1 | 3/2016 | Ji et al. | |
| 2016/0174902 | A1 | 6/2016 | Georgescu et al. | |

(Continued)

FOREIGN PATENT DOCUMENTS

WO   WO 2021/027254 A1 *   1/2020   ............. G06F 21/62

OTHER PUBLICATIONS

New insights and perspectives on the natural gradient method, James Martens, arXiv:1412.1193v8 [cs.LG] Mar. 13, 2017.*

(Continued)

*Primary Examiner* — David J Stoltenberg
(74) *Attorney, Agent, or Firm* — ADELI LLP

(57) ABSTRACT

Some embodiments of the invention provide a method for configuring a machine-trained (MT) network that includes multiple nodes. Each node of a set of the nodes generates an output value based on received input values and a set of configurable weights. The method propagates a set of inputs through the MT network to generate a set of outputs, with each input having a corresponding expected output. The method calculates a value of a loss function comprising (i) a first term that measures a difference between each generated output and its corresponding expected output and (ii) a second term that constrains the weights to discrete sets of allowed values and accounts for an increase in the first term due to constraining the weights to the discrete sets of values. The method uses the calculated value of the loss function to train the weights of the MT network.

23 Claims, 12 Drawing Sheets

(56) References Cited

U.S. PATENT DOCUMENTS

| | | | |
|---|---|---|---|
| 2016/0328643 A1 | 11/2016 | Liu et al. | |
| 2017/0161640 A1 | 6/2017 | Shamir | |
| 2018/0107925 A1* | 4/2018 | Choi | G06F 17/16 |
| 2018/0341857 A1 | 11/2018 | Lee et al. | |
| 2018/0373987 A1* | 12/2018 | Zhang | G06N 7/00 |
| 2019/0042948 A1 | 2/2019 | Lee et al. | |
| 2019/0138882 A1 | 5/2019 | Choi et al. | |
| 2019/0171927 A1* | 6/2019 | Diril | G06N 3/08 |
| 2019/0180184 A1 | 6/2019 | Deng et al. | |
| 2019/0188557 A1 | 6/2019 | Lowell et al. | |
| 2019/0228274 A1 | 7/2019 | Georgiadis et al. | |
| 2019/0251444 A1 | 8/2019 | Alakuijala et al. | |
| 2019/0340492 A1 | 11/2019 | Burger et al. | |
| 2019/0354842 A1 | 11/2019 | Louizos et al. | |
| 2020/0104688 A1* | 4/2020 | Benyahia | G06N 3/082 |
| 2020/0134461 A1 | 4/2020 | Chai et al. | |
| 2020/0202213 A1 | 6/2020 | Rouhani et al. | |
| 2020/0202218 A1 | 6/2020 | Csefalvay | |
| 2020/0210838 A1 | 7/2020 | Lo et al. | |
| 2020/0302269 A1 | 9/2020 | Ovtcharov et al. | |
| 2020/0364545 A1* | 11/2020 | Shattil | G06N 3/08 |
| 2021/0019630 A1* | 1/2021 | Yao | G06N 3/045 |
| 2021/0241097 A1* | 8/2021 | Zhao | G06V 10/764 |
| 2021/0264272 A1 | 8/2021 | Luo et al. | |
| 2022/0036155 A1* | 2/2022 | Guevara | G06N 3/044 |

OTHER PUBLICATIONS

Deep Fisher Kernels—End to End Learning of the Fisher Kernel GMM Parameters; Sydorov et al., 2014 IEEE Conference on Computer Vision and Pattern Recognition.*

Backpropagation Training for Fisher Vectors within Neural Networks, Wieschollek et al., arXiv:1702.02549v1 [cs.CV] Feb. 8, 2017.*

The Information Matrix in Control: Computation and Some Applications; James C. Spall, Proceedings of the 38 Conference on Decision & Control Phoenix, Arizona USA—Dec. 1999.*

Boo, Yoonho, et al., "Structured Sparse Ternary Weight Coding of Deep Neural Networks for Efficient Hardware Implementations," 2017 IEEE Workshop on Signal Processing Systems (SiPS), Oct. 3-5, 2017, 6 pages, IEEE, Lorient, France.

Deng, Lei, et al., "GXNOR-Net: Training Deep Neural Networks with Ternary Weights and Activations without Full-Precision Memory under a Unified Discretization Framework," Neural Networks 100, Feb. 2018, 10 pages, Elsevier.

Wang, Peiqi, et al., "HitNet: Hybrid Ternary Recurrent Neural Network," 32nd Conference on Neural Information Processing Systems (NeurIPS '18), Dec. 2018, 11 pages, Montreal, Canada.

Achterhold, Jan, et al., "Variational Network Quantization," Proceedings of 6th International Conference on Learning Representations (ICLR 2018), Apr. 30-May 3, 2018, 18 pages, ICLR, Vancouver, BC, Canada.

Andri, Renzo, et al., "YodaNN: An Architecture for Ultra-Low Power Binary-Weight CNN Acceleration," IEEE Transactions on Computer-Aided Design of Integrated Circuits and Systems, Mar. 14, 2017, 14 pages, IEEE, New York, NY, USA.

Courbariaux, Matthieu, et al., "Binarized Neural Networks: Training Neural Networks with Weights and Activations Constrained to +1 or −1," Mar. 17, 2016, 11 pages, arXiv:1602.02830v3, Computing Research Repository (CoRR)—Cornell University, Ithaca, NY, USA.

Courbariaux, Matthieu, et al., "BinaryConnect: Training Deep Neural Networks with Binary Weights during Propagations," Proceedings of the 28th International Conference on Neural Information Processing Systems (NIPS 15), Dec. 7-12, 2015, 9 pages, MIT Press, Montreal, Canada.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Guo, Yiwen, et al., "Network Sketching: Exploring Binary Structure in Deep CNNs," 2017 IEEE Conference on Computer Vision and Pattern Recognition (CVPR 2017), Jul. 21-26, 2017, 9 pages, IEEE, Honolulu, HI.

He, Zhezhi, et al., "Optimize Deep Convolutional Neural Network with Ternarized Weights and High Accuracy," Jul. 20, 2018, 8 pages, arXiv:1807.07948v1, Computing Research Repository (CoRR)—Cornell University, Ithaca, NY, USA.

Huan, Yuxiang, et al., "A Low-Power Accelerator for Deep Neural Networks with Enlarged Near-Zero Sparsity," May 22, 2017, 5 pages, arXiv:1705.08009v1, Computer Research Repository (CoRR)—Cornell University, Ithaca, NY, USA.

Jain, Anil K., et al., "Artificial Neural Networks: A Tutorial," Computer, Mar. 1996, 14 pages, vol. 29, Issue 3, IEEE.

Leng, Cong, et al., "Extremely Low Bit Neural Network: Squeeze the Last Bit Out with ADMM," Proceedings of 32nd AAAI Conference on Artificial Intelligence (AAAI-18), Feb. 2-7, 2018, 16 pages, Association for the Advancement of Artificial Intelligence, New Orleans, LA, USA.

Li, Fengfu, et al., "Ternary Weight Networks," May 16, 2016, 9 pages, arXiv:1605.04711v1, Computing Research Repository (CoRR)—Cornell University, Ithaca, NY, USA.

Merolla, Paul, et al., "Deep Neural Networks are Robust to Weight Binarization and Other Non-linear Distortions," Jun. 7, 2016, 10 pages, arXiv:1606.01981v1, Computing Research Repository (CoRR)—Cornell University, Ithaca, NY, USA.

Non-Published Commonly Owned Related U.S. Appl. No. 16/923,002, filed Jul. 7, 2020, 56 pages, Perceive Corporation.

Shayer, Oran, et al., "Learning Discrete Weights Using the Local Reparameterization Trick," Proceedings of 6th International Conference on Learning Representations (ICLR 2018), Apr. 30-May 3, 2018, 12 pages, ICLR, Vancouver, BC, Canada.

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

Theis, Lucas, et al., "Faster Gaze Prediction with Dense Networks and Fisher Pruning," Jul. 9, 2018, 18 pages, arXiv:1801.05787, Computer Research Repository (CoRR)—Cornell University, Ithaca, NY, USA.

Zhang, Dongqing, et al., "LQ-Nets: Learned Quantization for Highly Accurate and Compact Deep Neural Networks," Jul. 26, 2018, 21 pages, arXiv:1807.10029v1, Computer Research Repository (CoRR)—Cornell University, Ithaca, NY, USA.

Zhou, Shuchang, et al., "DoReFa-Net: Training Low Bitwidth Convolutional Neural Networks with Low Bitwidth Gradients," Jul. 17, 2016, 14 pages, arXiv:1606.06160v2, Computer Research Repository (CoRR)—Cornell University, Ithaca, NY, USA.

Zhu, Chenzhuo, et al., "Trained Ternary Quantization," Dec. 4, 2016, 9 pages, arXiv:1612.01064v1, Computing Research Repository (CoRR)—Cornell University, Ithaca, NY, USA.

Martens, James, "New Insights and Perspectives on the Natural Gradient Method," Nov. 21, 2017, 59 pages, retrieved from https://arxiv.org/abs/1412.1193v9.

Withagen, Heini, "Reducing the Effect of Quantization by Weight Scaling," Proceedings of 1994 IEEE International Conference on Neural Networks (ICNN '94), Jun. 28-Jul. 2, 1994, 3 pages, IEEE, Orlando, Florida, USA.

Vaswani, Sharan, "Exploiting Sparsity in Supervised Learning," Month Unknown 2014, 9 pages, retrieved from https://vaswanis.github.io > optimization_report.

Yan, Shi, "L1 Norm Regularization and Sparsity Explained for Dummies," Aug. 27, 2016, 13 pages, retrieved from https://blog.mlreview.com/l1-norm-regularization-and-sparsity-explained-for-dummies-5b0e4be3938a.

Chen, Shangyu, et al., "Deep Neural Network Quantization via Layer-Wise Optimization Using Limited Training Data," Proceeding of the 33rd AAAI Conference on Artificial Intelligence (AAAI-19), Jul. 2019, 8 pages, AAAI.

He, Yang, et al., "Soft Filter Pruning for Accelerating Deep Convolutional Neural Networks," Aug. 21, 2018, 8 pages, retrieved from https://arxiv.org/abs/1808.06866.

(56) References Cited

OTHER PUBLICATIONS

Hu, Yiming, et al., "A Novel Channel Pruning Method for Deep Neural Network Compression," May 29, 2018, 10 pages, retrieved from https://arxiv.org/abs/1805.11394.

Molchanov, Pavlo, et al., "Pruning Convention Neural Networks for Resource Efficient Inference," Jun. 8, 2017, 17 pages, retrieved from https://arxiv.org/abs/1611.06440.

Zhou, Aojun, et al., "Explicit Loss-Error-Aware Quantization for Low-Bit Deep Neural Networks", 2018 IEEE/CVF Conference on Computer Vision and Pattern Recognition, Jun. 18-23, 2018, 10 pages, IEEE, Salt Lake City, Utah, USA.

* cited by examiner $$H = \nabla^2 \mathcal{L}(w) \begin{pmatrix} \frac{\partial^2 \mathcal{L}}{\partial^2 w_{11}} & \frac{\partial^2 \mathcal{L}}{\partial w_1 \partial w_2} & \frac{\partial^2 \mathcal{L}}{\partial w_1 \partial w_3} & \cdots \\ \frac{\partial^2 \mathcal{L}}{\partial w_2 \partial w_1} & \frac{\partial^2 \mathcal{L}}{\partial^2 w_{22}} & \frac{\partial^2 \mathcal{L}}{\partial w_2 \partial w_3} \\ \frac{\partial^2 \mathcal{L}}{\partial w_3 \partial w_1} & \frac{\partial^2 \mathcal{L}}{\partial w_3 \partial w_2} & \frac{\partial^2 \mathcal{L}}{\partial^2 w_{33}} \\ \vdots & & & \ddots \end{pmatrix}$$

*Figure 5*

$$g_{ni} \begin{pmatrix} g_{11} & g_{12} & g_{13} & \cdots \\ g_{21} & g_{22} & g_{23} \\ g_{31} & g_{32} & g_{33} \\ \vdots & & & \ddots \\ g_{N1} & g_{N2} & g_{N3} \end{pmatrix}$$

*Figure 6*

$$\beta_i \begin{pmatrix} \beta_1 & \beta_2 & \beta_3 & \cdots \end{pmatrix}$$

*Figure 7*

$$H_{ii} \begin{pmatrix} H_{11} & 0 & 0 & \cdots \\ 0 & H_{22} & 0 \\ 0 & 0 & H_{33} \\ \vdots & & & \ddots \end{pmatrix}$$

*Figure 8*

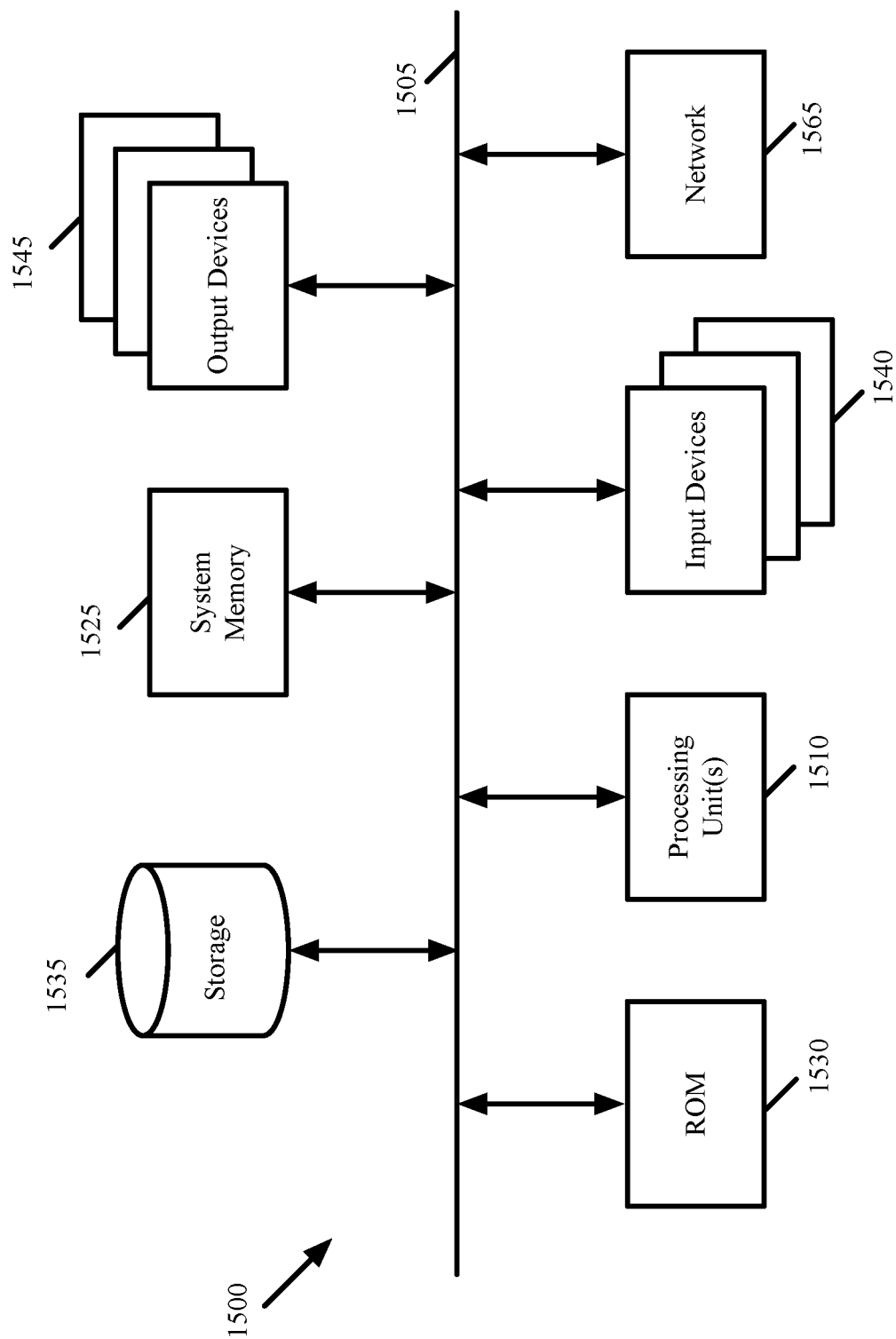

TRAINING A NEURAL NETWORK WITH QUANTIZED WEIGHTS

CLAIM OF BENEFIT TO PRIOR APPLICATIONS

This application claims the benefit of U.S. Provisional Patent Application 62/949,082, filed Dec. 17, 2019, and U.S. Provisional Patent Application 62/955,349, filed Dec. 30, 2019, both of which are incorporated herein by reference.

BACKGROUND

Machine learning automates the training, using historical data, of neural networks that can then be used to make predictions (inferences) from new data. Such neural networks typically involve many (e.g., thousands, millions, even billions) of weight values optimized during training of the neural network, and used when the trained neural network is embedded into a device (e.g., smart phones, IOT devices, etc.). These weights are often floating-point values (e.g., 32-bit values), which require a large amount of memory and are often too large to store on the processing units that execute the neural network. At runtime, these large weight values must be ported in at runtime from off-chip memory, which is a significant source of power consumption for the chip. The neural network calculations also require multiplying inputs with these floating-point weight values, which are another major source of power consumption for the chip executing the network.

One technique to avoid large floating-point values for the weights is to use a set of discrete values (e.g., binary or ternary values), which saves large amounts of memory in the aggregate, especially for networks that may have millions or billions of weights. When such small values are used, the data can also be stored on or closer to the chip, obviating importing the weight values and thereby providing major power savings. In addition, if the weight values are −1, 0, or 1, then multiplications can be replaced with addition/subtraction instead. Because addition and subtraction are computationally easier than multiplication, this provides additional power consumption savings. Further reductions in memory and power consumption can be achieved by imposing a sparsity condition that at least a particular percentage of the weight values for a network be set to zero.

In some cases that use sets of discrete values for the weights, these weights may be quantized from previously trained floating-point values, directly trained, or via a combination of both techniques. However, quantization of the weights may introduce error into the output of the neural network. Several techniques for retraining an MT network to quantize the weights and impose the sparsity condition have been previously proposed. However, these techniques do not take into account the impact of quantization on the MT network accuracy.

SUMMARY

Some embodiments of the invention provide a novel method for configuring a machine-trained (MT) neural network with multiple layers of processing nodes. The method of some embodiments trains an MT network with previously optimized floating-point weight values to have quantized weight values. Some embodiments train the MT network using a loss function that constrains the weight values to only the allowed quantized values, while accounting for a loss in accuracy of the MT network's output when using the quantized values instead of the optimized floating point values. In some embodiments, the quantized weight values are ternary values, with a different scaling factor determined for each layer of the MT network. Prior to training the MT network using the loss function to have quantized weight values, some embodiments initialize the values of the weights from the floating-point values to an initial set of the quantized values.

In some embodiments, the loss function includes (i) a first term that measures the difference between the actual output of the MT network and the expected output of the MT network, given a training input data set (i.e., a standard loss term) and (ii) a second term that constrains the weights to discrete sets of allowed values. This constraint term also accounts for the increase in loss when quantizing any individual weight (i.e., due to constraining the weights to the discrete sets of values). In other words, the constraint term is a loss-aware penalty term.

Some embodiments calculate a loss-aware penalty term of the loss function using the Hessian matrix of the first term of the loss function, where the diagonal values of the Hessian matrix are second-order partial derivatives of the loss function with respect to each weight in the MT network. In that case, the loss increase for a particular weight is linearly related to a corresponding diagonal term of the Hessian matrix. To minimize the computational burden of calculating the Hessian terms, some embodiments of the invention approximate the diagonal terms of the Hessian matrix using an empirical Fisher approximation method. The Fisher approximation method estimates the Hessian by computing first-order derivatives (e.g., gradients) of the loss function (with respect to the weights) during multiple prior training iterations of the MT network.

In some embodiments, the quantized values are ternary values $\{-1, 0, +1\}$ for each weight, multiplied by a scaling factor $\alpha_k$ that varies by the k-th network layer. Initializing the quantized weight values, prior to training the network with the loss function including the loss-aware penalty term, requires determining the scaling factor for each layer and quantizing each weight to one of the scaled ternary values. In some embodiments, the scaling factor for each layer of the MT network is first calculated by taking the variance of the floating-point weight values of the weights in that layer. The weight values in the k-th layer are initialized to the quantized values in some such embodiments by assigning each weight value to the nearest scaled ternary value, e.g. $\{-a_k, 0, +a_k\}$. In other embodiments, the scaling factor and the ternary value weight assignments are iteratively calculated based on the floating-point weight values of the MT network and the gradient terms from the prior training iterations of the MT network that were used to calculate the Fisher approximation to the Hessian matrix.

In some embodiments, a fraction of the weight values are set to a value of zero after initializing the layer scaling factors and the weight values. In order to minimize the impact on the loss that arises from setting weights to zero instead of their trained quantized values, this initial sparsity condition is imposed on the weights in some embodiments based on their corresponding diagonal values in the Hessian matrix. For example, in some embodiments the weights are ranked in order of increasing importance, where importance is a loss contribution value that is calculated based on the same gradient terms used to calculate the Fisher approximation to the Hessian matrix. A threshold is then applied to zero the weights with least importance (e.g., least contribution to loss). For example, if a threshold of 80% is applied, then 80% of the weights are set to zero, and the remaining 20% of the weights are those with the highest importance (e.g., most contribution to loss). In some embodiments, the initial sparsity condition is imposed on a global basis, by ranking all the weights in all layers of the network before applying the sparsity threshold. In other embodiments, to avoid imposing a bias against small-valued weights, the initial sparsity condition is applied on a layer-by-layer basis.

In some embodiments, after weight initialization, training the MT network using the loss function is performed in alternating stages. The first stage is calculating the value of the loss function using the initialized weight values and the layer scaling factors, and using that calculated value of the loss function to iteratively perform back-propagation to train the weight values of the MT network. In some embodiments, the training stage has two sub-stages, a prediction stage to minimize the loss-aware penalty term of the loss function, and a correction stage to minimize the standard loss term of the loss function.

The second stage is to perform a projection of the trained weight values to the allowed quantized values, and globally re-impose the sparsity condition. This projection stage is an iterative process in some embodiments, that alternates between optimizing the layer scaling factors with the ternary value assignments fixed, and optimizing the ternary value assignments with the layer scaling factors fixed. The global sparsity condition is imposed in some embodiments after the iterations for the projection stage have converged.

The training and projection stages are iteratively alternated until the MT network is trained to have fully quantized weights with minimized loss from the quantization. In some embodiments, after at least one iteration of training and projection stages, the Hessian matrix is re-calculated, for example by using the Fisher approximation. The new Hessian values are then used in subsequent projection stages.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIGS. 5-8 conceptually illustrate different stages of approximating a loss matrix using the process of FIG. 4.

FIG. 15 conceptually illustrates an electronic system with which some embodiments of the invention are implemented.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel method for configuring a machine-trained (MT) neural network with multiple layers of processing nodes. The method of some embodiments trains an MT network with previously optimized floating-point weight values to have quantized weight values. Some embodiments train the MT network using a loss function that constrains the weight values to only the allowed quantized values, while accounting for a loss in accuracy of the MT network's output when using the quantized values instead of the optimized floating point values. In some embodiments, the quantized weight values are ternary values, with a different scaling factor determined for each layer of the MT network. Prior to training the MT network to optimize the quantized weight values, some embodiments initialize the values of the weights from the floating-point values to an initial set of the quantized values in a way that accounts for the importance of the different weights.

Figure 1:
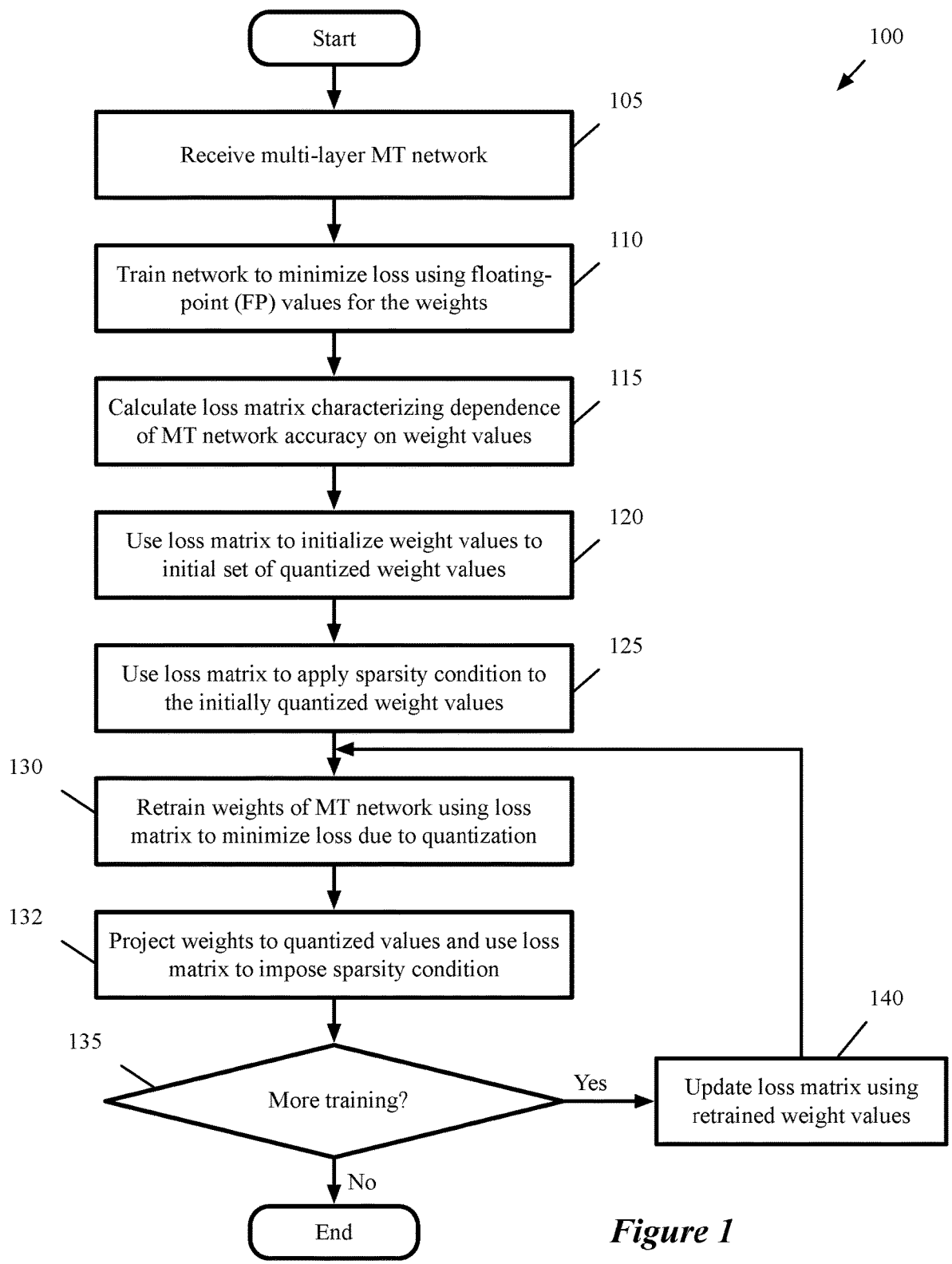
FIG. 1 conceptually illustrates a process of some embodiments for training a multi-layer network to execute a specific purpose, with the weight values used by the network belonging to a small discrete set of values.

FIG. 1 conceptually illustrates a process 100 of some embodiments for training a multi-layer network to execute a specific purpose, with the weight values used by the network belonging to a set of discrete values (rather than, e.g., large floating-point weight values). The process, in some embodiments, is performed by a network optimization application, which may be a program executing on a single device (e.g., a single laptop or desktop, a mobile device, a physical or virtual server, etc.) or a distributed application that operates on multiple machines (e.g., on multiple virtual machines within a datacenter).

Figure 2:
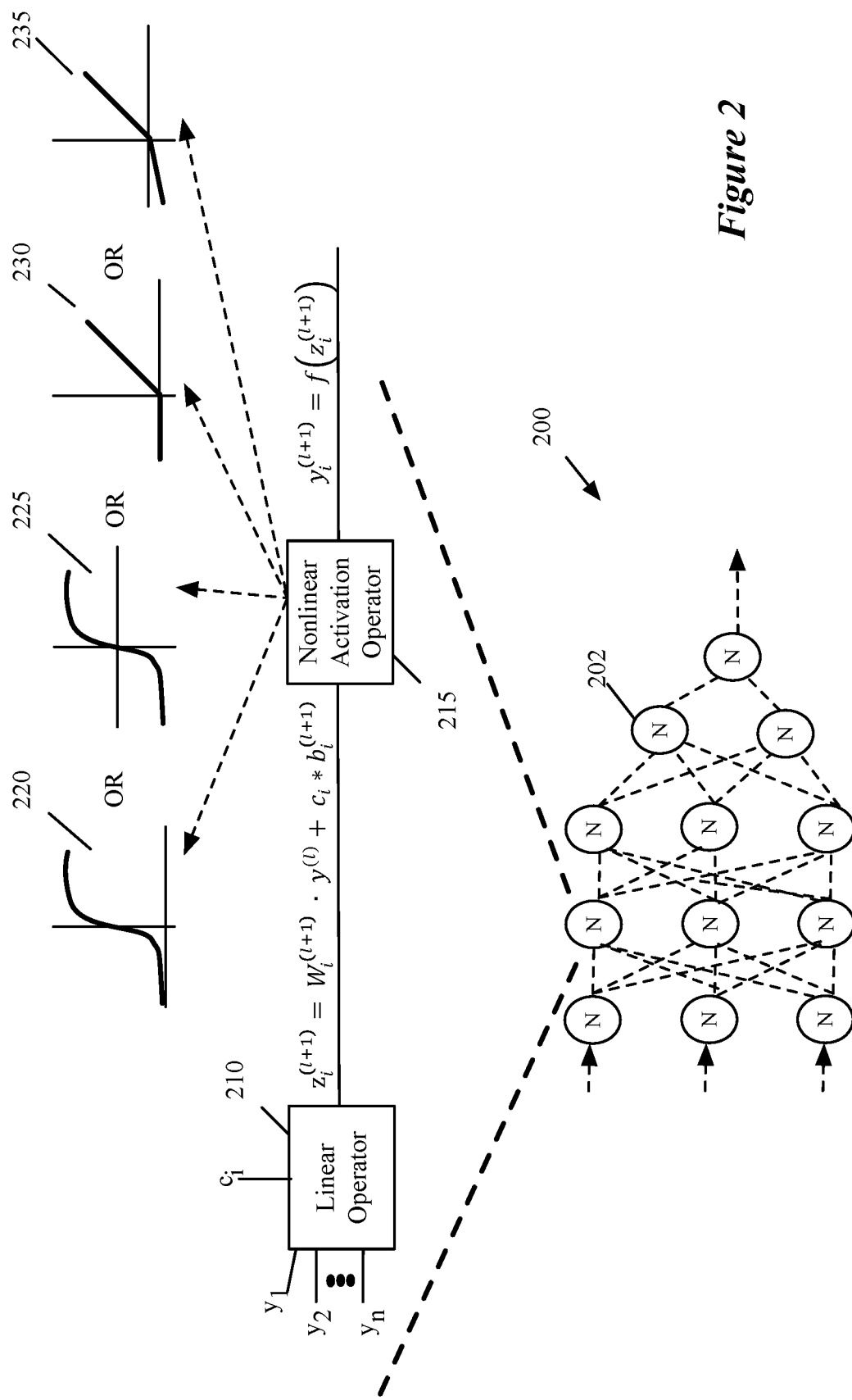
FIG. 2 illustrates an example of a multi-layer machine-trained network of some embodiments.

As shown, the process 100 receives (at 105) a multi-layer machine-trained (MT) network (e.g., a neural network) for training with initialized floating-point weights. The MT network of some embodiments is made up of numerous nodes, organized in layers, that produce output values based on one or more input values. These layers may include convolutional layers, pooling layers, element-wise operation layers, fully-connected layers, etc. In at least a subset of the hidden and output layers (e.g., the nodes of the convolutional and fully-connected layers), each node includes a linear component that uses a set of weight values to linearly combine the input values of the node, as well as a non-linear component that uses the output of the node's linear component to compute the output value for the node. FIG. 2, described below, illustrates an example of such a multi-layer network and the operation of at least a subset of its nodes.

The process trains (at 110) the network with floating point values for the weights. Specifically, in some embodiments, this training involves defining a loss function for the network that measures the error (i.e., loss) of the actual output of the network for a particular input compared to a predefined expected (or ground truth) output for that particular input. During one training iteration (also referred to as a training epoch), an input data set is first forward-propagated through the network nodes to compute the actual network output for each input in the data set. Then, the loss function is back-propagated through the network to adjust the weight values in order to minimize the error (e.g., using first-order partial derivatives of the loss function with respect to the weights, referred to as the gradients of the loss function). This optimization method for minimizing the output loss function, iteratively repeated over multiple epochs, is referred to as stochastic gradient descent (SGD). During the training, the average sum squares of the gradients are accumulated and stored for later use.

The process 100 calculates (at 115) a loss matrix to characterize the dependence of the accuracy of the MT network on the floating-point weight values. In some embodiments, the accuracy of the MT network is represented by the loss function used for floating-point training of the MT network. In that case, the loss matrix is the Hessian matrix of the loss function, where the diagonal values of the Hessian matrix are second-order partial derivatives of the loss function with respect to each weight in the MT network. The dependence of the loss increase of the MT network for a particular weight is proportional to a corresponding diagonal term of the Hessian matrix. To minimize the computational burden of calculating the Hessian terms, some embodiments of the invention approximate the diagonal terms of the Hessian matrix using a Fisher approximation method that estimates the Hessian using the first-order partial derivatives (e.g., the gradient) of the loss function that were used during the prior floating-point training iterations of the MT network.

The process 100 then uses (at 120) the loss matrix to initialize the floating-point weight values of the MT network to an initial set of discrete (quantized) weight values. In some embodiments, the quantized values for the i-th weight $w_i$ is a ternary value $q_i \in \{-1, 0, +1\}$, multiplied by a scaling factor $\alpha_k$ that varies by the layer (i.e., $\alpha_k$ is the scaling factor for layer k). In some embodiments, the scaling factor $\alpha_k$ and the ternary value weight assignments $q_i$ are iteratively calculated based on the floating-point trained weight values and the terms of the loss matrix (e.g., the empirical Fisher approximation to the Hessian matrix of the loss function) calculated at 115. This initialization operation is described in greater detail below.

The process also uses (at 125) the loss matrix to apply a sparsity condition to the initialized weight values. In some embodiments the weights are ranked in order of increasing importance, where the importance of each weight is a loss contribution value that is proportional to the weight's corresponding diagonal value in the loss matrix. A threshold is then applied to zero the weights with least importance (e.g., least contribution to the loss). For example, if a threshold of 80% is applied, then 80% of the weights are set to zero, and the remaining 20% of the weights are those with the highest importance (e.g., most contribution to the loss). In some embodiments, the initial sparsity condition is imposed on a global basis, by ranking all the weights in all layers of the network before applying the sparsity threshold. In other embodiments, to avoid imposing a bias against small-valued weights, the initial sparsity condition is applied on a layer-by-layer basis.

After initializing the weights, in some embodiments, the process 100 performs alternating stages to further train the (now-quantized) MT network. After weight initialization, the process 100 retrains (at 130) the (now-quantized) weights of the MT network using the loss matrix to minimize the loss due to quantization. This retraining begins with the initialized and sparsified weight values, and is discussed in further detail below. In this stage, the process 100 performs forward propagation to run a set of inputs through the quantized network (i.e., with the initialized weight values and layer scaling factors), then calculates the value of an updated loss function (that incorporates the loss matrix) based on these inputs and the resulting outputs. This calculated loss function value is used to again perform back-propagation to train the weight values of the MT network to new values that are close to (e.g., proximal to) the sets of discrete values. This updated loss function, in some embodiments, starts with the loss function used during the initial floating-point training of the MT network, with an additional constraint term for the loss function calculated from the loss matrix. This constraint term accounts for the increase in loss when quantizing any individual weight (e.g., due to constraining the weights to discrete sets of values). In other words, the constraint term is a loss-aware penalty term. Due to the presence of this term, this stage does not result in the same floating-point weight values as the initial training from operation 110, which was described above.

The process 100 then projects (at 132) the trained weight values to the allowed quantized values and re-imposes the sparsity condition. This projection stage is an iterative process in some embodiments, that alternates between optimizing the layer scaling factors with the ternary value assignments fixed, and optimizing the ternary value assignments with the layer scaling factors fixed. The global sparsity condition is imposed in some embodiments after the iterations for the projection stage have converged.

After the proximal and projection training stages, the process determines (at 135) whether more training is required. Some embodiments use a minimization process (e.g., a stochastic gradient descent minimizer) to determine when to stop training the network. Training is no longer necessary when the MT network has fully quantized weights with minimized loss from the quantization. If the process 100 determines that more training is not required, then the process ends with the quantized network weights defined. If the process 100 determines that further training is required, then in some embodiments the process updates (at 140) the loss matrix, e.g. by recalculating the Hessian matrix (or the Fisher approximation thereof) using the retrained weight values. The process then returns to 130, which was described above.

Before describing the use of the loss matrix in greater detail, machine-trained networks will be further described. One class of machine-trained networks are deep neural networks with multiple layers of nodes. Different types of such networks include feed-forward networks, convolutional networks, recurrent networks, regulatory feedback networks, radial basis function networks, long-short term memory (LSTM) networks, and Neural Turing Machines (NTM). Multi-layer networks are trained to execute a specific purpose in some embodiments. These purposes may include face recognition or other image analysis, voice recognition or other audio analysis, large-scale data analysis (e.g., for climate data), etc. In some embodiments, such a multi-layer network is designed to execute on a mobile device (e.g., a smartphone or tablet), an IOT device, etc.

FIG. 2 illustrates an example of a multi-layer machine-trained network of some embodiments. This figure illustrates a feed-forward neural network 200 that has multiple layers of processing nodes 202 (also called neurons). In all but the first (input) and last (output) layer, each node 202 receives two or more outputs of nodes from earlier processing node layers and provides its output to one or more nodes in subsequent layers. The output of the node (or nodes) in the last layer represents the output of the network 200. In different embodiments, the output of the network 200 is a number in a range of values (e.g., 0 to 1), a vector representing a point in an N-dimensional space (e.g., a 128-dimensional vector), or a value representing one of a pre-defined set of categories (e.g., for a network that classifies each input into one of eight possible outputs, the output could be a three-bit value).

In this example, the neural network 200 only has one output node. Other neural networks of other embodiments have several output nodes that provide more than one output value. Furthermore, while the network 200 includes only a few nodes 202 per layer, a typical neural network may include a varying number of nodes per layer (with some layers having several thousand nodes) and significantly more layers than shown (e.g., several dozen layers).

The illustrated network 200 is a fully-connected network in which each node in a particular layer receives as inputs all of the outputs from the previous layer. However, the neural networks of some embodiments are convolutional feed-forward neural networks. In this case, the intermediate layers (referred to as "hidden" layers) may include convolutional layers, pooling layers, fully-connected layers, and normalization layers. The convolutional layers of some embodiments use a small kernel (e.g., 3×3×3) to process each tile of pixels in an image with the same set of parameters. The kernels (also referred to as filters) are three-dimensional, and multiple kernels are used to process each group of input values in in a layer (resulting in a three-dimensional output). Pooling layers combine the outputs of clusters of nodes from one layer into a single node at the next layer, as part of the process of reducing an image (which may have a large number of pixels) or other input item down to a single output (e.g., a vector output). In some embodiments, pooling layers can use max pooling (in which the maximum value among the clusters of node outputs is selected) or average pooling (in which the clusters of node outputs are averaged).

As shown in FIG. 2, each node in the neural network 200 has a linear component 210 and a nonlinear component 215.

The linear component 210 of each hidden or output node in this example computes a dot product of a vector of weight coefficients and a vector of output values of prior nodes, plus an offset. In other words, a hidden or output node's linear operator computes a weighted sum of its inputs (which are outputs of the previous layer of nodes) plus an offset (also referred to as a bias). Similarly, the linear component 210 of each input node of some embodiments computes a dot product of a vector of weight coefficients and a vector of input values, plus an offset. In other embodiments, each input node receives a single input and passes that input as its output. Each node's nonlinear component 215 computes a function based on the output of the node's linear component 210. This function is commonly referred to as the activation function, and the outputs of the node (which are then used as inputs to the next layer of nodes) are referred to as activations.

The notation of FIG. 2 can be described as follows. Consider a neural network with L hidden layers (i.e., L layers that are not the input layer or the output layer). The index variable l can be any of the hidden layers of the network (i.e., $l \in \{1, \ldots, L-1\}$, with $l=0$ representing the input layer and $l=L$ representing the output layer). The variable $z_i^{(l+1)}$ represents the output of the linear component of a hidden i-th node in layer $l+1$. As indicated by the following Equation (1), the variable $z_i^{(l+1)}$ is computed as the dot product of a vector of weight values $W_i^{(l+1)}$ and a vector of outputs $y^{(l)}$ from layer l multiplied by a constant value $c_i$, and offset by a bias value $b_i$:

$$z_i^{(l+1)} = \left(W_i^{(l+1)} \cdot y^{(l)}\right) * c_i + b_i^{(l+1)} = \sum_{k=1}^{n}\left(w_{ik}^{(l+1)} * y_k^{(l)}\right) * c_i + b_i^{(l+1)}. \quad (1)$$

The constant value $c_i$ is a value to which all the weight values are normalized. In some embodiments, the constant value $c_i$ is 1. The symbol * is an element-wise product, while the symbol · is the dot product. The weight coefficients W are parameters that are adjusted during the network's training in order to configure the network to solve a particular problem (e.g., object or face recognition in images, voice analysis in audio, depth analysis in images, etc.). In some embodiments, the training algorithm imposes certain constraints on the weight values. Specifically, some embodiments impose a ternary constraint that requires all of the weight values for any given layer to be either zero, a positive value, or a negation of the positive value (e.g., 0, 1, and −1). In addition, some embodiments use a training technique that maximizes the number of weight values that are equal to zero (such that, e.g., 75% or 90% of the weight values equal zero).

The output of the nonlinear component 215 of a node in layer $l+1$ is a function of the node's linear component, and can be expressed as by Equation (2) below:

$$y_i^{(l+1)} = f(z_i^{(l+1)}). \quad (2)$$

In this equation, f is the nonlinear activation function for the i-th node. Examples of such activation functions include a sigmoid function 220 ($f(x)=1/(1+e^{-x})$), a tan h function 225, a ReLU (rectified linear unit) function 230 ($f(x)=\max(0, x)$) or a leaky ReLU function 235, as shown.

Traditionally, the sigmoid function and the tan h function have been the activation functions of choice. More recently, the ReLU function has been proposed for the activation function in order to make it easier to compute the activation function. See Nair, Vinod and Hinton, Geoffrey E., "Rectified linear units improve restricted Boltzmann machines,"

ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015. In some embodiments, the activation functions can be other types of functions, like cup functions and periodic functions.

Equation (2) can be expressed in the following expanded format of Equation (3):

$$y_i^{(l+1)} = f(z_i^{(l+1)}) = f\left[\left(\sum_{k=1}^n w_{ik} * y_k\right) * c_i + b_i^{(l+1)}\right], \quad (3)$$

where $w_{ik}$ are weight values associated with the inputs $y_k$ of the i-th node in layer l+1.

Before a multi-layer network can be used to solve a particular problem, the network has to be put through a supervised training process that adjusts the network's configurable parameters (e.g., the weight coefficients of its linear components). The training process iteratively selects different input value sets with known output value sets. For each selected input value set, the training process typically (1) forward propagates the input value set through the network's nodes to produce a computed-output value set, and then (2) back propagates a gradient (rate of change) of a loss function (output error) that quantifies the difference between the input set's known output value set and the input set's computed output value set, in order to adjust the network's configurable parameters (e.g., the weight coefficients). Some embodiments introduce an additional term that biases or constrains the training of the weight coefficients towards a discrete set of values (e.g., −1, 0, and 1).

Figure 3:
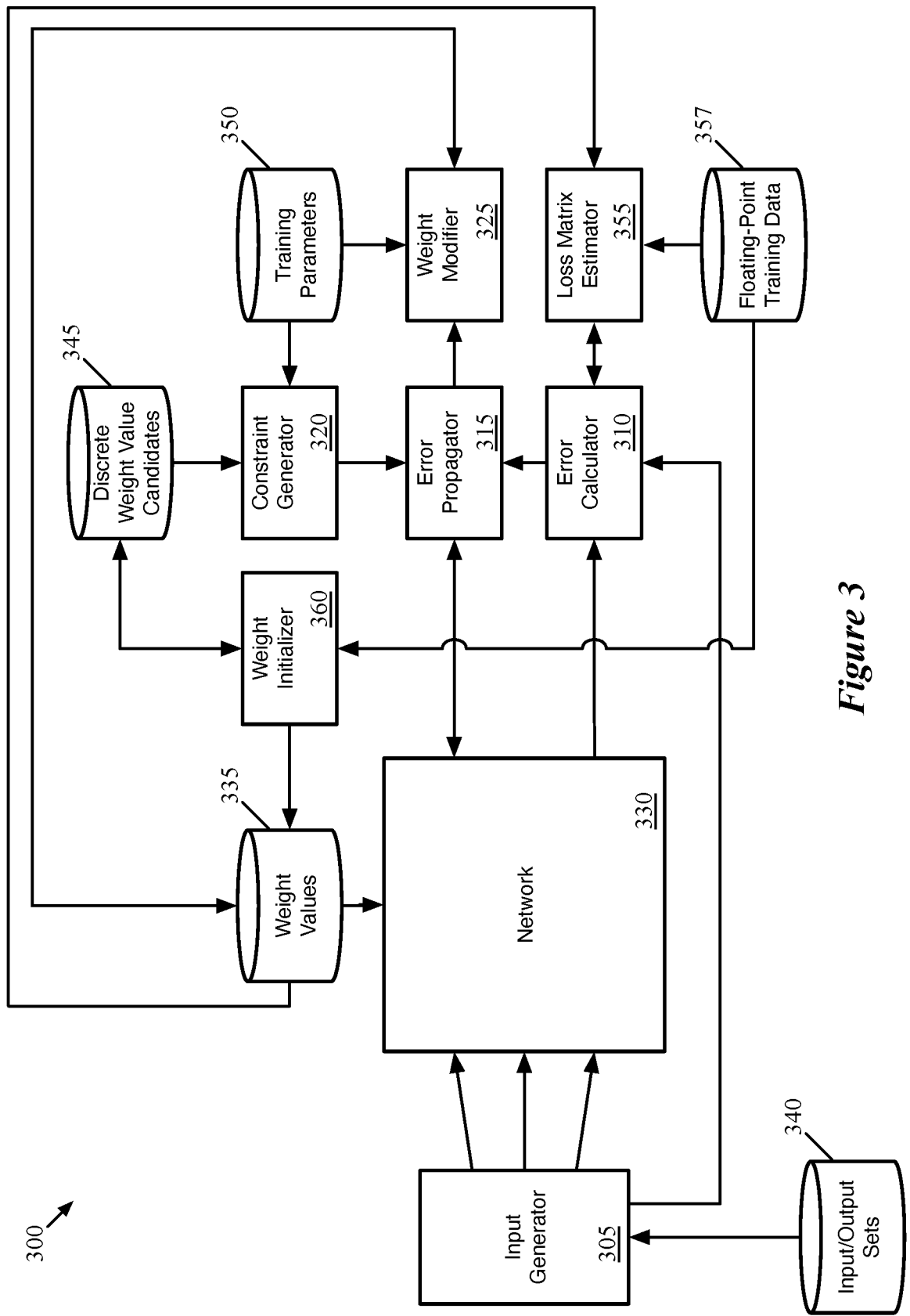
FIG. 3 conceptually illustrates a training system of some embodiments that trains the weight values (and other parameters) of a network so as to ensure that (i) each weight is assigned a value that belongs to a discrete set of allowed weight values (including zero) for that weight and (ii) at least a threshold percentage of the trained weight values are equal to zero.

FIG. 3 conceptually illustrates a training system 300 of some embodiments that trains the weight values (and other parameters) of a network so as to ensure that (i) each weight is assigned a value that belongs to a set of allowed weight values (including zero) for that weight and (ii) at least a threshold percentage of the trained weight values are equal to zero. In some embodiments, the training system 300 uses the sets of allowed weight values to generate additional constraint terms for the loss function that are used in the training, in order to constrain the trained weight values to those allowed values. The allowed values may be the same for all nodes in a network being trained, different for each layer of nodes, or different for each node in the network. The resulting weight values are used for the multi-layer machine-trained network when embedded in a device.

Some embodiments initially train the network with floating point weight values, then use these initially trained weight values to initialize each weight to a quantized value in the set of allowed weight values for that weight. Using the loss function augmented with a constraint term, the Alternating Direction Method of Multipliers (ADMM) technique is used for subsequent training of the quantized values while forcing as many of the weight values as possible to zero. The ADMM technique is described in the paper "Extremely Low Bit Neural Network: Squeeze the Last Bit Out with ADMM" by Leng, Cong, et al., 32nd AAAI Conference on Artificial Intelligence, pp. 3466-3473 (2018), which is incorporated herein by reference. In some embodiments, the training is iterative, and alternately optimizes (i) the portion of the loss function that measures the difference between expected and actual outputs and (ii) the constraint term that forces the weight values to their sets of allowed values.

As shown, the system 300 has a number of modules, including an input generator 305, an error calculator 310, an error propagator 315, a constraint generator 320, a weight modifier 325, a loss matrix estimator 355, and a weight initializer 360, all of which will be described in further detail below. In some embodiments, all of these modules execute on a single device, such as a server, a desktop or laptop computer, a mobile device (e.g., a smartphone, tablet, etc.), a virtual machine, etc. In other embodiments, these modules may execute across multiple interconnected devices (or virtual machines), or separate instances may execute on multiple devices (or virtual machines) for additional computing power.

The network 330 of some embodiments is a multi-layer machine-trained network (e.g., a feed-forward neural network), such as that shown in FIG. 2. This network 330 includes multiple layers of nodes, including a layer of input nodes, at least one layer of hidden nodes, and a layer of output nodes (a typical network will include many layers of hidden nodes, including various different types of layers). Each of at least a subset of the hidden nodes and output nodes includes a linear component (that uses the weight values 335) and a non-linear activation function (i.e., the nodes of convolutional and fully-connected layers). The network 330 receives an input and computes a corresponding output.

The weight values 335 are used to parametrize the network, and are trained by the system 300 for the network to perform a particular task. In some embodiments, during the initial training (e.g., before applying ADMM and quantizing the weights), the weights are represented by floating point values. In some embodiments, the possible candidate weight values (i.e., the set of allowed values) for each weight in the network are the ternary set {−1,0,+1}. In other embodiments, the candidate values are different for each layer of the network, with the candidate set being {−$\alpha_k$,0,+$\alpha_k$} for the k-th layer. In this case, however, the weights can be normalized to the scale of {−1,0,+1}.

During the initial (floating-point) training process of some embodiments, floating point weight values ranging from −1 to 1 are used. During this training, inputs are forward propagated through the network to generate output values, which are compared to expected (ground truth) output values using a loss function. This loss function is then back-propagated to modify the weights using the rate of change of the loss function with respect to a change in the weight at the current value of the loss function. This process is repeated until the weight values have converged to optimized floating point values. In some embodiments, the results of this training (e.g., the optimized floating point weight values, the gradients of the loss function with respect to each weight for one or more iterations of training) is stored as floating-point training data 357, which is used in some embodiments by the weight initializer 360 to initialize the quantized weight values and the loss matrix estimator 355 to calculate the loss matrix.

For subsequent training to quantize the weight values (e.g., using ADMM), each of the weights is initialized to one of its respective allowed values, and this value is used during forward propagation. This initialization is in some embodiments as simple as projecting the floating point value to the nearest allowed value. In other embodiments, the initialization is an iterative process using the loss matrix, as will be described in further detail below. During subsequent training iterations, the weights may be pushed between the values in their respective sets of allowed values. Training the network using ADMM is described in further detail below with reference to FIG. 13.

The input/output sets 340 include various inputs to the network as well as the corresponding expected (ground truth) outputs for each of the inputs. For the inputs, some embodiments perform training with a large number of different inputs, as this can help train the weight values for an average input. Each input in an input set may be an image, a voice snippet, etc. that is to be propagated through the network, depending on the specific purpose for which the network is being trained. For example, if a network is being trained to identify faces, the set of inputs will include numerous images of several different people's faces, probably including various types of edge cases (e.g., images where the face is distorted, where objects partially appear in front of the face, etc.). Each input also has a corresponding expected (ground truth) output that is what the network should generate as its output when presented with that input.

As mentioned, in some embodiments, each layer of nodes is assigned a set of allowed weight values during training. That is, after training, each weight value for each node in the layer will have an assigned weight value that is one of the possible weight values for the layer. In some such embodiments, the set of allowed weight values has two possible values (binary) of $\{0, \alpha_k\}$ or three possible values (ternary) of $\{-\alpha_k, 0, +\alpha_k\}$. The $\alpha_k$ for each layer varies between layers in some embodiments. During training, the various techniques described above are used to constrain the weights to these two or three values and, in some embodiments, to ensure that at least a threshold percentage of the values come out to 0. The discrete weight value candidates storage 345 stores this information (i.e., the $\alpha_k$ for each layer) for use during initialization as well as to generate the constraints used in optimization.

These techniques of (i) using at most three weight values per layer that can be represented as $\{-1, 0, +1\}$ (quantization) and (ii) ensuring that at least a threshold percentage of the weight values are zero (sparsification) enables the design of networks that can be loaded onto and executed by specialized network inference circuits that use the network to process input data (e.g., images, sound clips, etc.) for which the network is trained. Specifically, certain neural network inference circuits are designed for networks that meet these constraints. Such neural network inference circuits are described in further detail below as well as in U.S. patent application Ser. No. 16/457,756, filed Jun. 28, 2019, now issued as U.S. Pat. No. 11,049,013, which is incorporated herein by reference.

To train the network with quantized weights, as described further below, the input generator 305 selects a set of inputs (and corresponding expected outputs) from the input/output sets 340. The network 330 processes these inputs (using the now-quantized weight values 335) to generate computed outputs. The error calculator 310 uses a loss function that computes the difference between the computed and expected outputs (e.g., the loss function used to train the floating point weight values) in addition to including other terms specific to training with quantized weight values.

In some embodiments, this loss function includes (i) a first term that measures the difference between the actual output of the MT network and the expected output of the MT network, given a training input data set (i.e., a standard loss term) and (ii) a second term that biases or constrains the weights to discrete sets of allowed values. In some embodiments, the constraint term also accounts for the increase in loss when quantizing any individual weight (i.e., due to constraining the weights to the discrete sets of values). In other words, the constraint term is a loss-aware penalty term in these embodiments.

The derivation of such a loss-aware penalty term will now be described. Starting with a floating-point MT network that converges to a (local) minimum in error, for any change $\delta(w)$ in the neural network parameters, the corresponding change in loss is approximated in some embodiments using a $2^{nd}$ order approximation around the floating-point weight values as follows by Equation (4):

$$\mathcal{L}(w + \delta w) - \mathcal{L}(w) \cong g^T \delta w + \frac{1}{2} \delta w^T H \delta w, \qquad (4)$$

where $g = \nabla L(w)$ is the gradient of the loss function, and $H = \nabla^2 L(w)$ is the Hessian matrix of the loss function. In other embodiments, a different loss matrix can be used instead of the Hessian to estimate the corresponding change in loss. The loss matrix is assumed to be the Hessian for the purposes of discussion below, but not limited to the Hessian of the loss function in other embodiments.

Using Equation (4), the impact of quantizing a single floating point weight $w_i$ to a quantized value $q_i$ can be considered. The change in parameter can be written as $\delta(w) = (q_i - w_i) e_i$, where $e_i$ is the unit vector with value of zero everywhere except the i-th position where the value is 1. With this in mind, and considering that that gradient averages to 0 over the training samples (since the floating-point MT network started from a local minimum), the change in loss from quantizing the i-th weight $w_i$ to a quantized value $q_i$ can be represented by Equation (5) as follows:

$$\mathcal{L}(w + (q_i - w_i) e_i) - \mathcal{L}(w) \cong \frac{1}{2} (q_i - w_i)^2 H_{ii}, \qquad (5)$$

where $H_{ii}$ are the diagonal elements of the Hessian matrix H, corresponding to second-order partial derivatives of the loss function with respect to each weight in the MT network.

In some embodiments, the Hessian (loss matrix) is calculated by the loss matrix estimator module 355. The loss matrix estimator 355 uses the weight values 335 and data from the floating point training data storage 357 to estimate the terms of the loss matrix. In some cases (e.g., in order to update the loss matrix during the course of training with quantized values), the loss matrix estimator 355 also uses information from the error calculator 310.

To minimize the computational burden of calculating the Hessian terms, in some embodiments the loss matrix estimator 355 approximates the diagonal terms of the Hessian matrix using a Fisher approximation method, as described in further detail below with reference to FIG. 4. The Fisher approximation method may be a standard Fisher approximation method or an empirical Fisher approximation method (e.g., an empirical estimate of the Fisher information of $w_i$) in different embodiments. The empirical Fisher approximation method estimates the Hessian by computing first-order derivatives (e.g., gradients) of the loss function (with respect to the weights) during multiple prior training iterations of the MT network, which are stored in the floating-point data storage 357. See Theis, Lucas, Korshunova, Iryna, Tejani, Alykhan, Huszir, Ferenc, "Faster Gaze Prediction with Dense Networks and Fisher Pruning," arXiv preprint arXiv:1801.05787, 2018, which is incorporated by reference.

As noted above, some embodiments calculate the loss-aware penalty term using the Hessian matrix of the loss function, or the Fisher approximation to the Hessian matrix. A discussion here follows of how this loss-aware term can be integrated in some embodiments into training techniques such as ADMM for quantizing the floating point weight values.

In some embodiments, the error calculator 310 uses the loss matrix terms to generate the loss-aware penalty term for use by the error propagator 315. The standard ADMM (loss-unaware) penalty term for the loss function is given by Equation (6):

$$\mathcal{L}_{ADMM} = \frac{\rho}{2} \sum_k \|\hat{W}_k + \lambda_k - Q_k\|^2, \quad (6)$$

where $\hat{W}_k \equiv W_k/\alpha_k$ and $\lambda_k$ is the Lagrange multiplier for the k-th layer. The penalty assumes that quantization-constraint violations are of equal importance for all weights in a layer, while violations in a layer with a small weight scale ($\alpha_k$) are more expensive than violations in a layer with large weight scale. Given knowledge of the Hessian (assumed diagonal), it can be used in some embodiments to measure the cost of the constraint violation for any weight.

The Hessian (or in this case, the Fisher approximation H) functions as a metric on the space of network weights. The loss-aware ADMM penalty term becomes:

$$\mathcal{L}_{ADMM} = \frac{\rho}{2}(W + \lambda - \alpha Q)^T H(W + \lambda - \alpha Q), \quad (7)$$

where W is the vector of all the (floating-point) weights $w_i$ and Q is the vector of all the quantized values $q_i \in \{-1,0,+1\}$. The parameter p controls the regularization forces, dictating how fast the quantization will take place. If p is too large, the penalty loss will be given a too big importance, the weights will be strongly pulled towards their projected counterparts, and the network will be quickly quantized, but with a large loss in precision. If p is too small, the penalty loss will not matter, and the weights will never get pulled closer to a quantized version. In some embodiments, the algorithm uses individual values $P_k$ per layer. In other embodiments, a global value of ρ is used for all layers.

Prior to the training system 300 training the quantized weights with the augmented loss function, the weight initializer 360 generates initial quantized weight values, using the floating-point training data 357 (i.e., the optimized floating point weight values) and the weight value candidates 345. As discussed above, in some embodiments the allowed weight values are quantized ternary values {−1,0,+1} for each weight, multiplied by a scaling factor $\alpha_k$ that varies by the k-th network layer. The general strategy for initializing the weight values prior to training the network with the loss function (e.g., using ADMM) is based on minimizing the distance for each weight between its floating point value and its corresponding quantized value. Initializing the quantized weight values, prior to retraining the MT network with the loss function including the loss-aware penalty term, requires determining the scaling factor (e.g., for each layer) and quantizing each weight to one of the scaled ternary values. For any given weight, the optimal quantized value may not be the closest quantized value to the optimal floating-point value.

In some embodiments, the initialization of the weights is performed for each layer of the MT network by calculating the variance (or standard deviation) of the floating-point weight values of the weights in the selected layer. The positive and negative values of variance (or, alternatively, the standard deviation) are then defined as the scaling factors for that layer. For example, if the scaling factor for the k-th layer calculated in this manner is represented by $\alpha_k$, the ternary discrete values that are allowed for weights are $\{-\alpha_k, 0, +\alpha_k\}$. The weights in the k-th layer are then assigned (or "snapped") to each weight value in the layer to the nearest of these ternary discrete values. Alternatively, in some embodiments, the scaling factors are calculated on all the weights in all the layers of the network simultaneously. After initialization, whether per-layer or globally, the sparsity condition can be applied, as discussed in further detail below. However, this approach for initializing the weights does not take into account the impact of quantization on the neural network accuracy when assigning the weight values to the allowed values.

Other embodiments do take into account the quantization impact on the neural network accuracy when initializing the weight values. In such embodiments, the scaling factor and the ternary value weight assignments are iteratively calculated based on the floating-point weight values of the MT network, and the loss increase due to quantization of the weights. This loss increase is calculated using the loss matrix, which characterizes the impact of each weight on the accuracy of the network.

In some embodiments, the loss matrix is the Hessian matrix H of the loss function. As described above, instead of calculating the Hessian matrix H, some embodiments use a Fisher approximation H, also referred to as the Fisher Information Matrix (FIM). As noted, the Fisher approximation uses the gradient terms from prior floating-point training iterations of the MT network, as will now be described.

Figure 4:
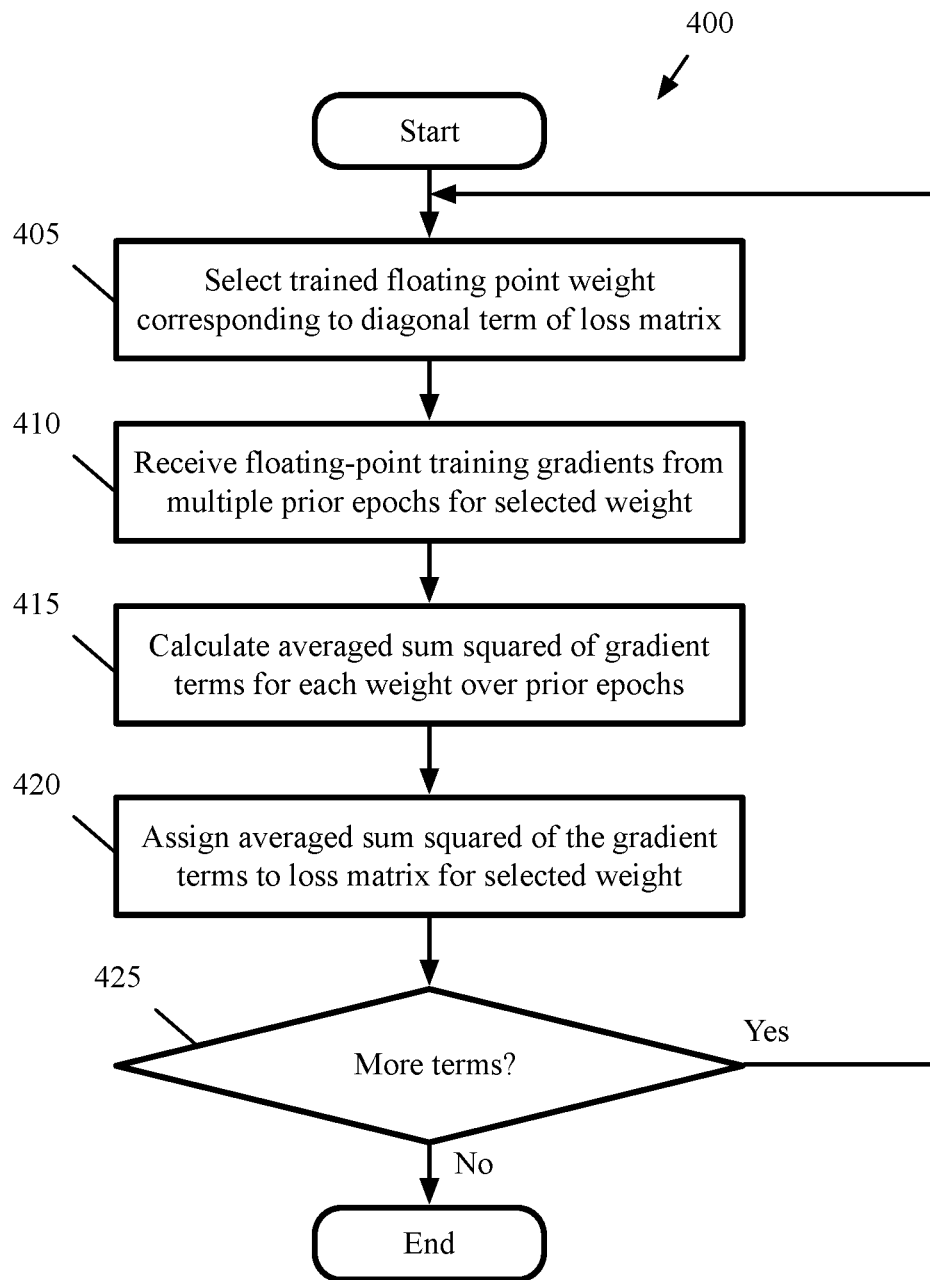
FIG. 4 conceptually illustrates a process of some embodiments for estimating a loss matrix for characterizing the impact of quantizing each weight on the accuracy of the network.

FIG. 4 conceptually illustrates a process of some embodiments for estimating terms of the loss matrix using the Fisher approximation. The process 400 is performed in some embodiments by the loss matrix estimator module 355 of the training system 300. The process 400 is also discussed with reference to FIGS. 5-8, which conceptually illustrate different stages of the Fisher approximation method.

The process 400 begins by selecting (at 405) a floating-point weight of the MT network corresponding to one of the diagonal terms of the Hessian matrix. A sample Hessian matrix is illustrated in FIG. 5, which is a square matrix of size M×M, where M is the total number of weights. The off-diagonal terms of the Hessian matrix are second-order partial derivatives of the loss function with respect to two different weights. However, the diagonal terms are second-order partial derivatives with respect to a single weight. Accordingly, the first weight corresponds to the first diagonal term, the second weight corresponds to the second diagonal term, etc.

For the selected weight $w_i$, the process 400 receives (at 410) the corresponding gradients that were stored during N previous epochs of floating-point training for the MT network. These gradients are illustrated in FIG. 6, as a matrix of N columns (corresponding to each of the previous training epochs) and M rows (one per weight). Here, $g_{ni}$ is the gradient of the loss function with respect to the n-th prior floating-point training iteration, for the i-th weight. Note that in some embodiments, when using neural network software such as PyTorch, computing these gradient terms often does not require substantial extra computations, as the gradients are already available (e.g., stored in the floating point training data storage 357) from the prior floating-point training iterations.

The process 400 then calculates (at 415) the averaged sum squared $\beta_i$ of the N gradient terms for the selected (i-th) weight:

$$\beta_i = \frac{1}{2N}\sum_{n=1}^{N} g_{ni}^2. \tag{8}$$

The average sum squared gradients are illustrated in FIG. 7, as a vector of length M. These terms are independent of the quantized value chosen for the weight.

Once the averaged sum squared gradient $\beta_i$ has been calculated, the process 400 assigns (at 420) this value to the i-th term of the diagonal Hessian matrix. The value $\beta_i$ is actually the empirical Fisher approximation $H_{ii}$ to the corresponding i-th diagonal term of the Hessian matrix. The Fisher Information Matrix, illustrated in FIG. 8, is an M×M matrix of all the diagonal terms. In some embodiments, there is a linear scaling factor (e.g., a factor of 2) between each pair of $\beta_i$ and $H_{ii}$ terms.

After assigning the i-th term, the process 400 determines (at 425) whether there are additional terms of the loss matrix (i.e., the Fisher Information Matrix) remaining to estimate. If so, the process returns to 405 to select the next weight and calculate the loss matrix term for that weight, which was described above. If not, the process 400 ends.

Figure 9:
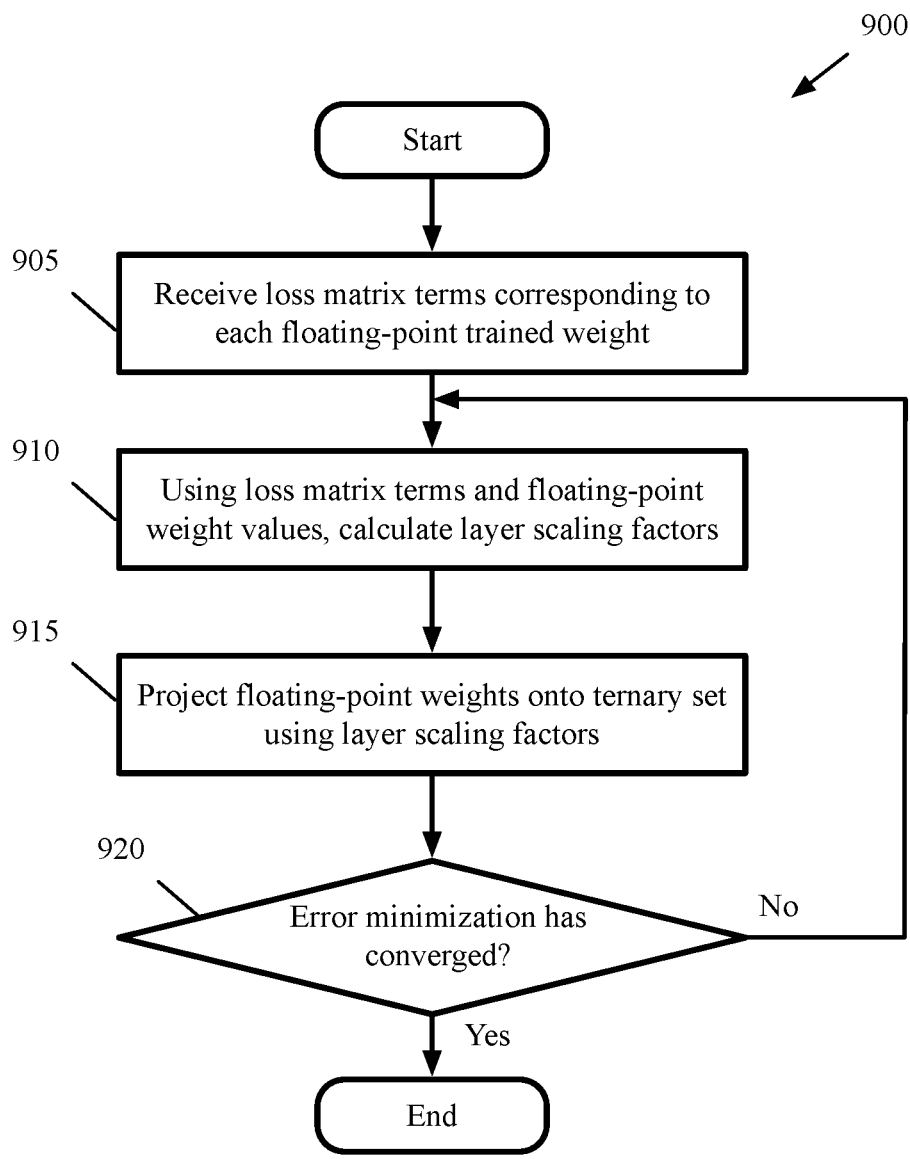
FIG. 9 conceptually illustrates a process of some embodiments for loss-aware initialization of the weight values, using the loss matrix.

Once the loss matrix has been generated by the loss matrix estimator 355, the weight initializer module 360 can use this matrix to initialize the quantized weight values for training. FIG. 9 conceptually illustrates a process 900 of some embodiments for loss-aware initialization of the weight values. The process 900 begins by receiving (at 905) the loss matrix terms. In some embodiments, the process receives the loss matrix terms from the loss matrix estimator 355, calculated as described above by reference to FIG. 4. The loss matrix is a diagonal matrix (i.e., the cross terms are equal to zero), the diagonal terms of which each correspond to one of the floating-point trained weights of the MT network.

Using the loss matrix terms and the floating-point weight values, the process 900 calculates (at 910) the scaling factor for the weights at each layer. This calculation is made loss-aware by taking into account the loss increase $\Delta_i$ due to quantization of any individual weight $w_i$ to a quantized value $q_i$. As noted above, in some embodiments the loss matrix terms are the averaged sum squares of the gradient terms $\beta_i$, which are an empirical Fisher approximation to the diagonal terms of the Hessian matrix. This loss increase $\Delta_i$ is represented in such embodiments by Equation (9) as follows, which is derived from substitution of Equation (8) into Equation (5).

$$\Delta_i \equiv L(w+(q_i-w_i)e_i)-L(w)=(q_i-w_i)^2\beta_i. \tag{9}$$

Note that the loss increase $\lambda_1$ is linearly dependent on the loss matrix terms. One simplifying assumption of some embodiments is that the total increase in loss from quantization of the weight values equals the sum of the individual losses. In that case, for the k-th layer with M filters in the MT network, the loss increase is written as:

$$\Delta_i=(\alpha_k q_i-w_i)^2\beta_i, i\in[1\ldots M], \tag{10}$$

where $\alpha_k$ is the scaling factor for the k-th layer while $q_i \in \{-1,0,+1\}$. In order to minimize the total loss, the sum of these errors must be minimized as follows:

$$\min\sum_{i=1}^{M}\Delta_i \equiv \min\sum_{i=1}^{M}\beta_i(\alpha_k q_i - w_i)^2. \tag{11}$$

Equation (11) can be solved in some embodiments by applying an iterative strategy, as described in "Extremely Low Bit Neural Network: Squeeze the Last Bit Out with ADMM" by Leng, Cong, et al. (incorporated by reference above). In some embodiments, this iterative strategy is applied on a layer-by-layer basis. First, for the k-th layer with M filters, the process 900 computes the layer scaling factor $\alpha_k$ from Equation (12):

$$\alpha_k = \frac{\sum_{i=1}^{M} w_i \beta_i q_i}{\sum_{i=1}^{M} \beta_i q_i^2}. \tag{12}$$

Here, $q_i$ is actually $q_{ki}$ since the strategy is applied on a layer-by-layer basis. The vector of all quantized values for the k-th layer can be accordingly represented as $Q_k$. However, this need not be the case, as will be discussed in further detail below. The initial value of $q_i$ used to calculate $\alpha_k$ according to Equation (12) is randomly assigned in some embodiments. In other embodiments, the initial value of $q_i$ is chosen to minimize the term ($\alpha_k q_i-w_i$), though after the iterative process has converged, the final values of $q_i$ may not satisfy that condition for all weights, since Equation (11) is a minimization over the sum of all the residual quantization errors.

The process 900 uses the layer scaling factors to compute (at 915) $q_i$ for each weight in the k-th layer as a projection of $w_i/\alpha_k$ on the ternary set $\{-1,0,+1\}$:

$$q_i = \prod_{\{-1,0,+1\}} \frac{w_i}{\alpha_k}. \tag{13}$$

With the computed values of $\alpha_k$ for each layer and $q_i$ for each weight in that layer, the process 900 determines (at 920) whether the minimization of Equation (11) has converged. If the minimization has not converged, then the process 900 returns to 910, to continue updating the layer scaling factors and projecting the floating-point weights onto the updated ternary sets. If the minimization has converged, then the process 900 ends.

Figure 10:
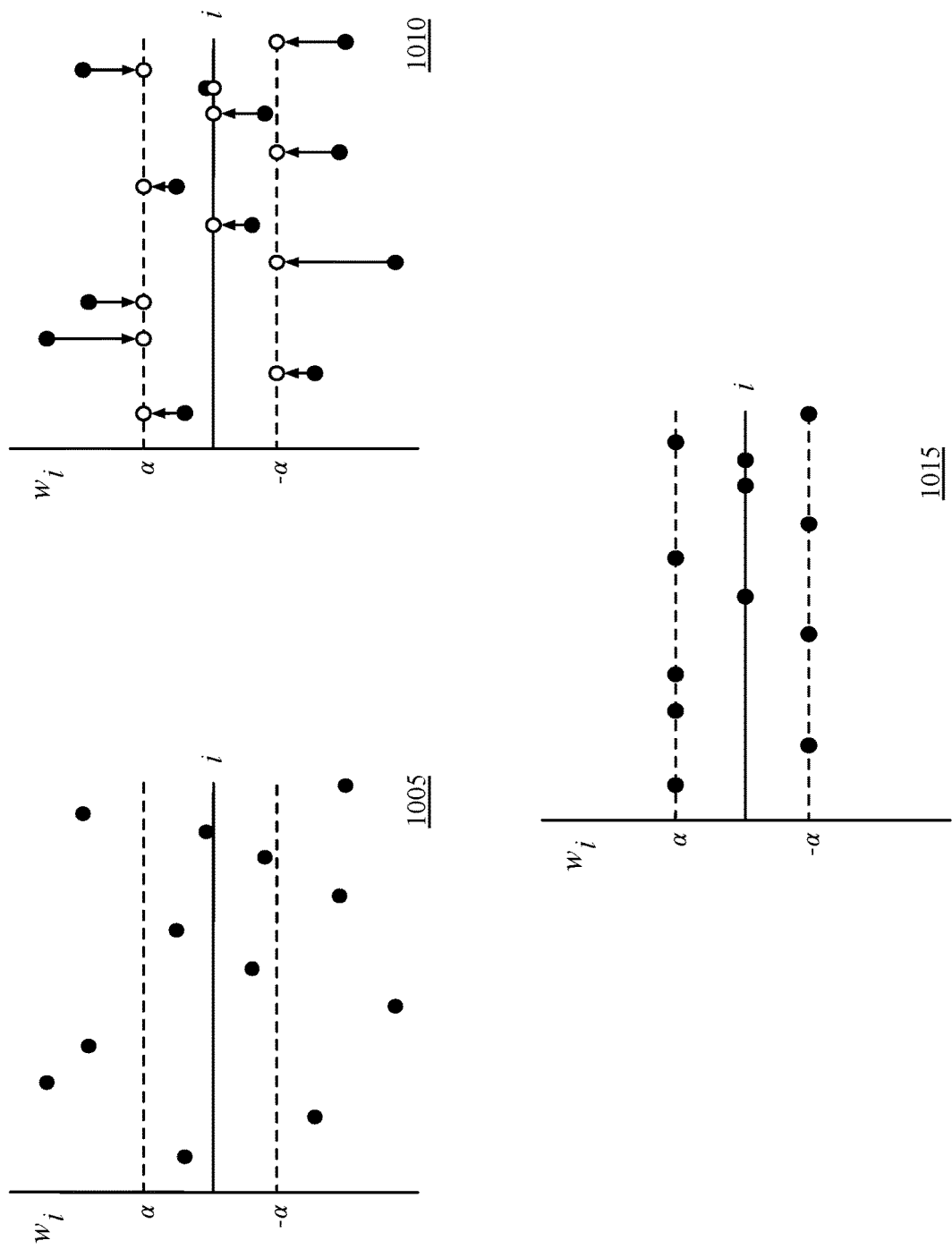
FIG. 10 conceptually illustrates the projection of weight values from their floating point values to the allowed set of discrete values.

FIG. 10 conceptually illustrates the projection of weight values from their floating point values to the allowed set of discrete values. The horizontal axis is the weight index for a particular layer, and the vertical axis is the weight value $w_i$. In a first stage 1005, the weights have trained floating point values (represented by filled circles), defined during the initial training of the MT network (e.g., as described above with reference to operation 110 of FIG. 1). The layer scaling factor $\alpha$ is also displayed on the vertical axis, as a positive and a negative value. These layer scaling factors are calculated from the weight values $w_i$ as described above.

In a second stage 1010, the weight values are projected onto the ternary set $\{-1,0,+1\}$, e.g. using Equation (13) above. The filled circles represent the original floating point value for each weight as before, and the open circles represent the new allowed value $\alpha_k q_i$ for the quantized weight. The projection is represented as an arrow from the original trained floating point value to the new, discrete value.

A third stage 1015 illustrates the final, quantized values of the weights, which are one of the three values {−α,0,+α} (which as noted above, is different in some embodiments for each layer). In some embodiments, the projected value for every weight is not necessarily the closest value in the discrete set for that layer.

As noted above, in some embodiments, a portion of the weight values are set to a value of zero (or, "sparsified") after initializing the layer scaling factors and the weight values. That is, beyond the weights that are set to zero during the standard initialization described by reference to the process 900, some embodiments set additional weights to the value zero that would otherwise have values of $\pm\alpha_k$. In order to minimize the impact on the loss that arises from setting weights to zero instead of their initialized quantized values, in some embodiments this initial sparsity condition is selectively imposed on the weights based on their contribution to the overall loss. In other words, the sparsity condition that is imposed is a loss-aware sparsity. In some embodiments, the weights are sparsified by the weight initializer module 360 of the training system 300.

The diagonal values $H_{ii}$ of the Hessian matrix H are second-order partial derivatives of the loss function with respect to each weight in the MT network. In that case, the loss increase for a particular weight is linearly related to a corresponding diagonal term of the Hessian matrix. Weights with more contribution to the quantization loss increase are more important for generating correct outputs, and therefore there should be more reluctance to set these weights to zero. Weights with less contribution to the quantization loss increase are less important for optimization, and are better candidates for sparsification.

Figure 11:
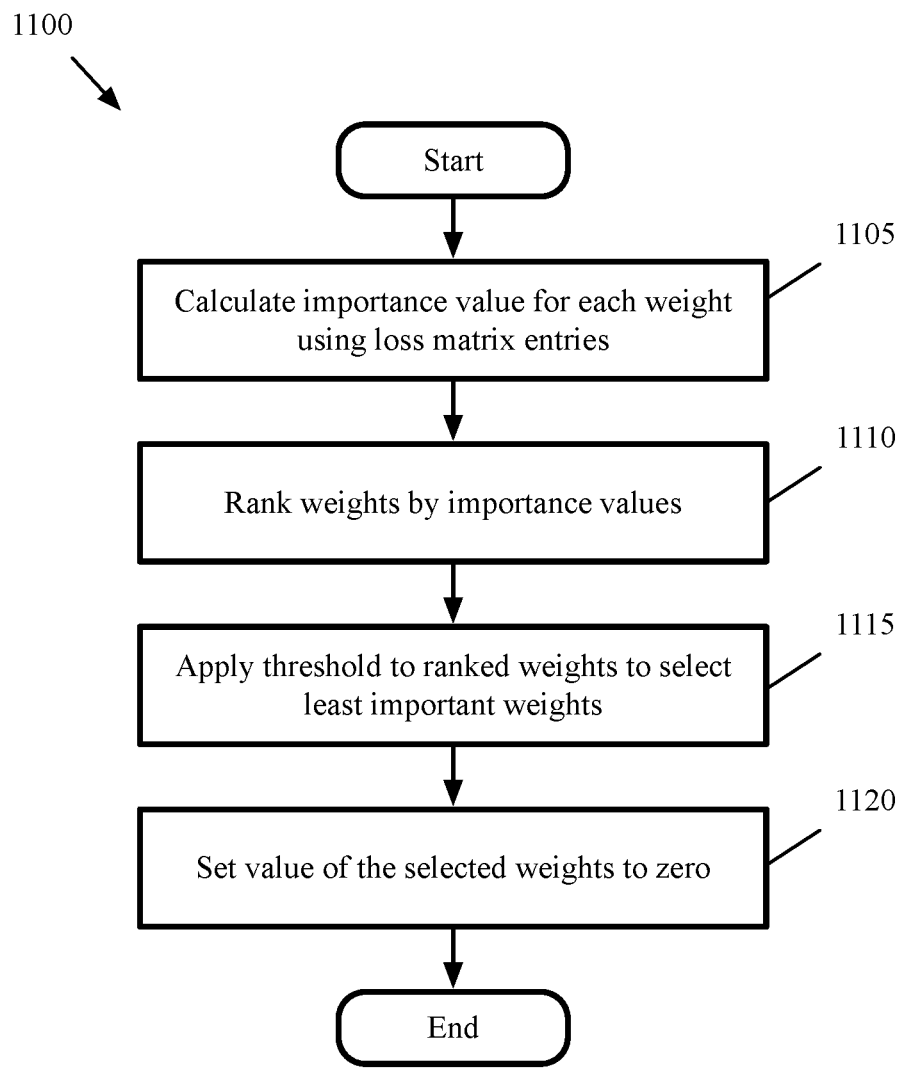
FIG. 11 conceptually illustrates a process of some embodiments for applying a loss-aware sparsity condition to the quantized weights, using the loss matrix.

FIG. 11 conceptually illustrates a process of some embodiments for applying a loss-aware sparsity condition to the quantized weights. The process 1100 is performed in some embodiments by the weight initializer module 360 of the training system 300. As shown, the process 1100 begins by calculating (at 1105) an importance value for each weight. In some embodiments, the importance is expressed in terms of the loss increase, which is proportional to the terms of the loss matrix. For example, when the loss matrix is the Hessian matrix H of the loss function, the importance can be estimated using the gradient terms used to calculate the Fisher approximation H. These gradient terms are the averaged sum squared of the gradients for each weight, $\beta_i$ (as defined by Equation (8) above). Some embodiments calculate the importance of each weight according to:

$$w_i^2 \beta_i, \quad (14)$$

which is independent of the actual quantized value chosen for that weight. Note that the importance is linearly proportional to $\beta_i$, so is therefore assumed to be linearly proportional to the loss matrix entries $\beta_i$ that are approximated by the Fisher method as described above in reference to Equation (8).

The process 1100 then ranks the weights $w_i$ (at 1110) by their importance values. Weights with the low importance values contribute the least to the overall loss when they are quantized from their trained floating-point values to a quantized value. Conversely, weights with high importance values contribute the most to the overall loss.

Next, the process 1100 applies (at 1115) a threshold to identify the weights with least importance. For example, if a threshold of 80% is applied, then 80% of the weights are selected. Common thresholds range from 75% to 90%, though other thresholds may be used in different embodiments.

The process then sets (at 1120) the value of the identified weights to zero. The remaining weights (e.g., in the example above, the remaining 20% of the weights) are those weights with the highest importance values, as calculated by expression (14) above. The process 1100 then ends.

Figure 12:
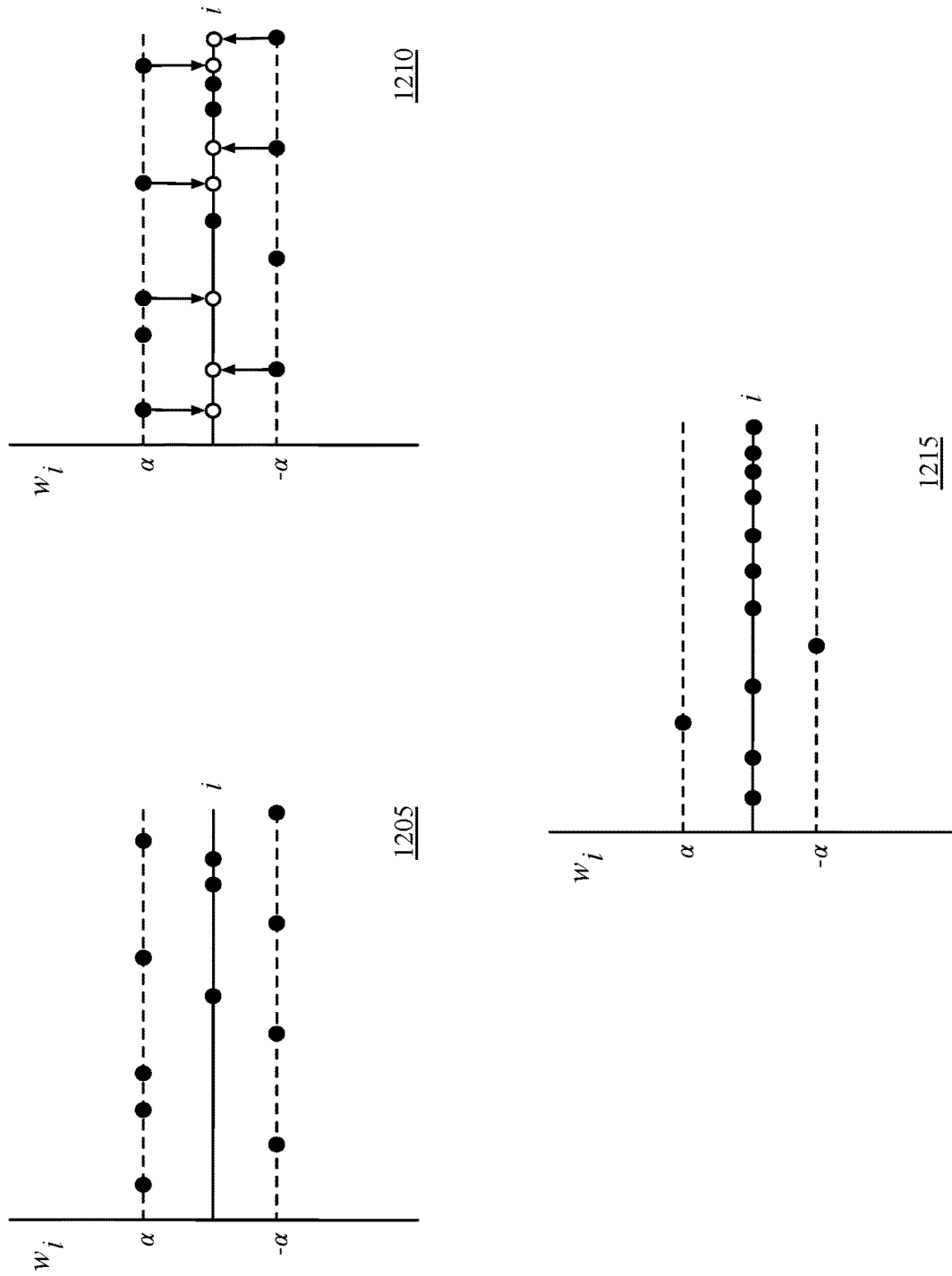
FIG. 12 conceptually illustrates application of the sparsity condition to the quantized weights in FIG. 10.

FIG. 12 conceptually illustrates application of the sparsity condition to the quantized weights in FIG. 10. As noted above, the horizontal axis is the weight index for a particular layer, and the vertical axis is the weight value $w_i$. The layer scaling factor α is also displayed on the vertical axis, as a positive and a negative value. These layer scaling factors were calculated from the weight values $w_i$ as described above.

In a first stage 1205 of FIG. 12, the weights have quantized values (represented by filled circles), assigned during the projection step (e.g., as described above with reference to operation 120 of FIG. 1). In a second stage 1210, the sparsity condition is applied to the quantized weight values, based on their importance value calculated using Equation (14) above. In this example, the sparsity threshold is 80%, so at least 80% of the weight values (those with the least importance) are selected for sparsification. The filled circles represent the quantized value for each weight as before, and the open circles represent the new sparsified value (i.e., zero) for those selected weights. Applying the sparsity condition is represented as an arrow from the quantized value to zero.

A third stage 1215 illustrates the final, sparsified values of the weights. As before, all the weights remain quantized, with one of the three values {−α,0,+α} (which as noted above, is different in some embodiments for each layer). The value of weights that had a value of zero prior to the sparsification remains unchanged.

In some embodiments, the initial sparsity condition is imposed on a global basis, by ranking all the weights in all layers of the network before applying the sparsity threshold. However, the constraint term of the loss function is proportional in some embodiments to the difference between the floating point weight values and the scaled quantized values, and not the value of the weight itself. Therefore, the projection to the quantized values (e.g., Equation (13) above) is biased to sparsify weights in a layer in which the weights are small in magnitude, which could potentially result in 100% weight sparsity for some layers. To avoid imposing such a bias in such embodiments against small-valued weights, the initial sparsity condition is instead applied on a layer-by-layer basis. Subsequent projection steps (using Equation (13) above) can then impose the sparsity condition at the network level, allowing the sparsity to vary across layers as the optimization proceeds.

Given the Fisher Information Matrix (FIM) H, a cost can be assigned to weight rounding errors. Unlike the standard ADMM penalty term, the loss-aware FIM-ADMM penalty term does not intrinsically underweight the quantization errors for weights with small magnitude. If the weights in a layer are scaled by a common factor, then the Hessian components for that layer will proportionally scale to the inverse square of the weight scaling factor, exactly canceling factors of the weight scaling factor. This shows that the FIM-ADMM penalty term is invariant under a rescaling of the weights in a layer.

With the FIM-ADMM penalty term, therefore, the optimal layer scales are chosen in some embodiments simultaneously subject to the constraint of global (network) sparsity. This enables the initial computation of $\alpha_k$ and $Q_k$ to exploit the flexibility of sparsifying some layers more than others, a flexibility that is otherwise only possible after fixing the $\alpha_k$. Moreover, this allows updating the $\alpha_k$ periodically, e.g., at the end of ADMM major iterations (which are described in further detail below).

As seen above, the standard ADMM penalty term of Equation (6) is modified in some embodiments to generate a loss-aware FIM-ADMM penalty term, e.g. Equation (7). ADMM then operates as usual with the modified loss function to retrain the MT network using the loss-aware (i.e., H-aware) penalty term.

In some embodiments, after weight initialization, training the MT network using the loss-aware loss function is performed in alternating stages. The first stage is calculating the value of the loss function using the initialized weight values and the layer scaling factors, and using that calculated value of the loss function to iteratively perform back-propagation to train the weight values of the MT network. This stage is referred to as the proximal step, and is aimed at optimizing the weights in order to minimize a loss composed of the initial optimization loss (the loss that would be used to train the full precision network, without ADMM) and a penalty/regularization loss which tries to bring the network's weights as close as possible to a set of quantized, projected weights.

Figure 13:
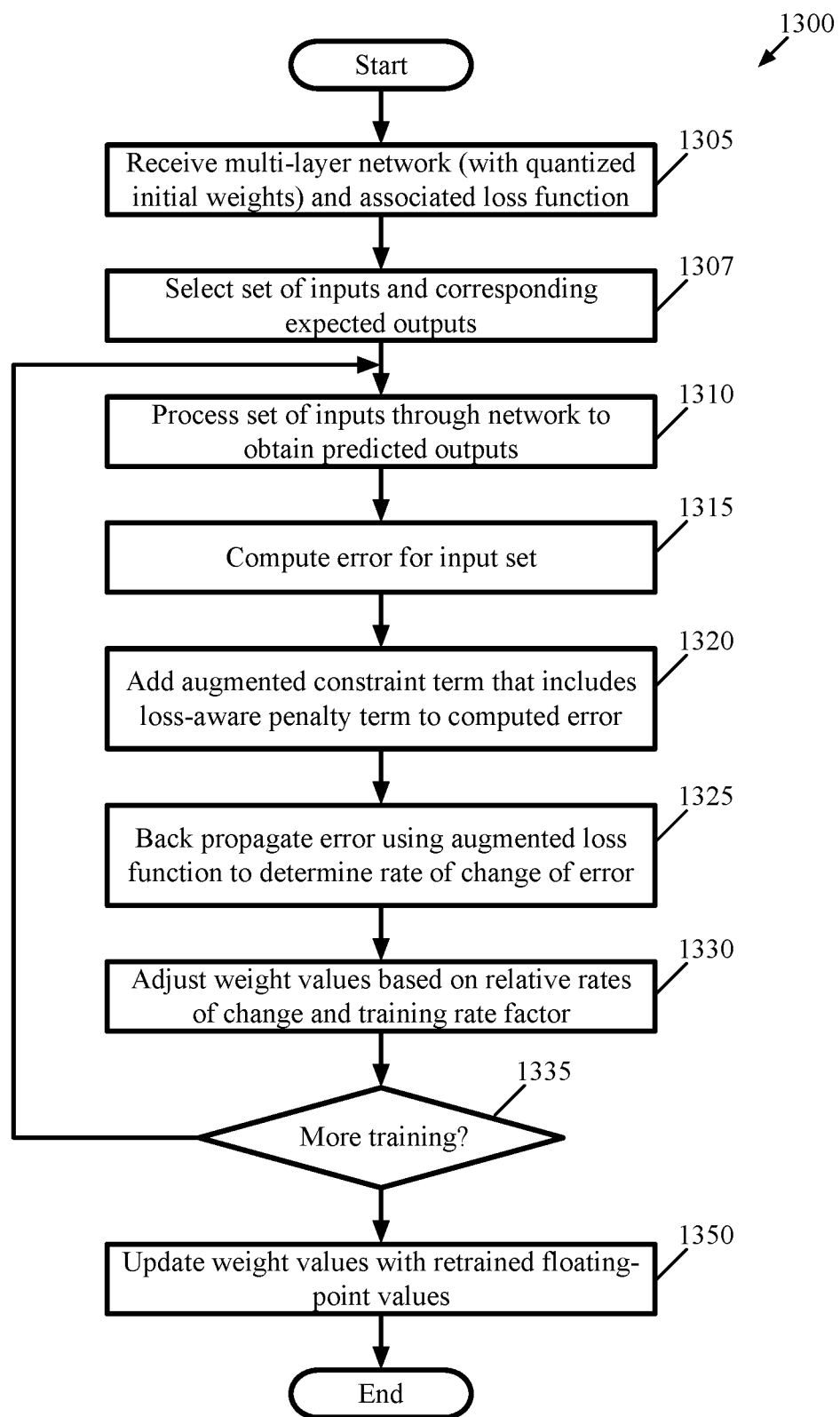
FIG. 13 conceptually illustrates a process of some embodiments performed by the training system (or a similar system) to retrain the MT network, using a loss-aware penalty term to augment the loss function.

FIG. 13 conceptually illustrates a training process 1300 of some embodiments to perform the proximal step of retraining the MT network using the loss-aware penalty term. In some embodiments, this process 1300 is performed by several modules of the training system 300 (or a similar system). In some embodiments, this optimization is broken into two alternating sub-stages, referred to as the prediction stage (to minimize the penalty term of the loss function) and the correction stage (to minimize the standard loss term of the loss function). At the beginning of the run, when $\lambda=0$, the initial weight projection used to compute Q is informed by H, as described above. This same H-aware penalty term is used in stochastic gradient descent (SGD) optimization to update W. Weights with larger Hessian entries will be subject to greater constraint forces.

As shown, the process 1300 begins by receiving (at 1305) a multi-layer network (with the initial trained floating-point weight values), and the associated loss function that was used to train the floating-point values. The network 330 of some embodiments is a multi-layer machine-trained network (e.g., a feed-forward neural network), such as that shown in FIG. 2. It includes multiple layers of nodes, including a layer of input nodes, at least one layer of hidden nodes, and a layer of output nodes. Each hidden node and output node includes a linear component (that uses the weight values 335) and a non-linear activation function. For each input the network 330 receives, it generates a corresponding output.

The process 1300 selects (at 1307) a set of inputs and corresponding expected outputs from the sets of inputs and outputs 340. In some embodiments, the input generator 305 breaks up the inputs into constituent values to be fed into the input layer of the network 330. For instance, for a network being trained for face recognition, the input generator might simply divide the pixels into several sections, or might perform computations based on the pixel values and feed these to the input layer (e.g., the percentage of red pixels in the image, the average red value of each pixel, or other statistics). That is, based on the input (e.g., an image), the input generator 305 might perform a set of computations in order to generate the inputs for the input layer of the network 330.

The process 1300 processes (at 1310) the selected set of inputs through the network 330 to obtain predicted outputs (i.e., outputs predicted according to the current state of the network). Each input propagates through the processing nodes of the network 330, with each layer of nodes receiving their one or more inputs and generating an output to pass to the next layer of nodes. In the final output layer, one or more nodes receives the outputs from the previous layer and generates the outputs of the network. In some embodiments, this processing entails, for each node, the linear component first computing a weighted sum of its input values (according to the quantized initial weight values 335), and then the non-linear activation function computing an output based on this weighted sum.

The process 1300 computes (at 1315) the error of the predicted outputs versus the expected outputs for the selected inputs (i.e., the standard loss function term). In some embodiments, the error calculator 310 computes the error for each individual input as the network 330 generates its output. The error calculator 310 receives both the predicted output from the input generator 305 and the output of the network 330, and uses the augmented loss function to quantify the difference between the predicted output and the actual output for each input. Some embodiments compute this as a simple difference, or absolute value of the difference, between the two values; other embodiments compute the square of the differences, or other such measure. In addition, some embodiments sum or average the loss function value for each input in a set of inputs.

The process 1300 adds (at 1320) the augmented constraint term that includes the loss-aware penalty term to the computed error (so that the loss function includes both the standard loss term and the augmented constraint term). The constraint term, as described above, penalizes weights for not having values in the allowed set of discrete values. In some embodiments, the loss matrix estimator 355 modifies the standard ADMM penalty term of Equation (6), to generate a loss-aware FIM-ADMM penalty term, e.g. Equation (7). The loss matrix estimator 355 provides this loss-aware term to the error calculator 310 so that it can be used in the computation of loss. This calculated error (including all of the terms) is passed to the error propagator 315 in some embodiments.

The process 1300 uses the augmented loss function to back-propagate (at 1325) the error to determine the rate of change of the error with respect to a change of each weight value. In some embodiments, the error propagator 315 performs the back-propagation using the augmented loss function to determine, for each weight, the rate of change of the loss function with respect to a change in the weight at the current value of the loss function. The backpropagation process uses the chain rule for partial derivatives to isolate the partial derivative of the augmented loss function with respect to each individual weight used in the multi-layer network, and assign a value to this partial derivative for the current value of the augmented loss function. Thus, this process identifies the relative effect on the augmented loss function of changes to the many different weights used to generate the outputs of the network.

Specifically, if L is the augmented loss function (including the loss-aware penalty term), then the backpropagation computes, for each weight $w_{ik}$, the partial derivative $$\frac{\partial L}{\partial w_{ik}}.$$

Because the weights are isolated in a node's output computation as well as (typically) in any constraint terms, computing these partial derivatives is not difficult via application of the chain rule. In this sense, the augmented loss function is a function in many-dimensional space (i.e., with the various weight coefficient values being the many dimensions), and the nature of the function means that the effect of each weight value can be easily isolated for a given loss function value.

The process 1300 adjusts (at 1330) the weight values based on the relative rates of change and a training rate factor. That is, the error propagator 315 provides, for each weight value $w_{ik}$, the partial derivative of the augmented loss function with respect to that $w_{ik}$. These partial derivatives are used by the weight modifier 325 to update the weight values by moving the weight values in the direction opposite the gradient (to attempt to reduce the loss function value) by a particular amount, with a larger partial derivative for a particular weight (i.e., a component of the gradient) resulting in a greater change to that weight. The weight modifier 325 uses a training rate factor from the training parameters 350 to determine how much to change the weight values based on the instantaneous gradient components. That is, the gradient component for a particular weight provides an amount to move (in the direction opposite to the gradient component, as the goal is to minimize the loss function) that weight value relative to the other weight values, while the training rate specifies the distance of that move.

After the weights (and any other network parameters) are updated, the process 1300 determines (at 1335) whether to perform additional training. Some embodiments use a minimization process (e.g., a stochastic gradient descent minimizer) to determine when to stop training the network. In some embodiments, the system 300 only stops training the network once (i) a large enough percentage of the weight values have been set to zero, (ii) all of the weights are set to one of their respective allowed candidate values, and (iii) the weights have changed by less than a threshold for a particular number of training iterations. In some embodiments, the input generator 305 determines whether to perform more training, and in other embodiments, a different module (e.g., a module not shown in FIG. 3 makes this determination). If further training is required, the process returns to 1310, which was described above. Otherwise, the process 1300 updates (at 1350) the weight values with the retrained weight values, and the process ends.

After performing the proximal step, the second stage is to perform a projection of the retrained weight values to the allowed quantized values, and globally re-impose the sparsity condition. This projection step is an iterative process in some embodiments, that alternates between optimizing the layer scaling factors with the ternary value assignments fixed, and optimizing the ternary value assignments with the layer scaling factors fixed. In some embodiments, the projection step is performed using the process 900, as described above, with the retrained weight values (e.g., updated in operation 1350, as described above) as the floating-point values for a starting point. The global sparsity condition is imposed in some embodiments after the iterations for the projection stage have converged.

The procedure for updating $\alpha_k$ and $Q_k$ in some embodiments alternates between minimizing the loss-aware ADMM penalty term over Q (globally) and $\alpha_k$ (per-layer) until the reduction in the penalty term becomes sufficiently small. Minimization over Q operates on all the network weights simultaneously, enforcing the global-sparsity target threshold. Minimizing over each $\alpha_k$ independently minimizes the total squared quantization error for each layer, given the current iterate for $Q_k$.

The proximal and projection steps are iteratively alternated until the MT network is trained to have fully quantized weights with minimized loss from the quantization. A third stage, referred to as the dual-update step, is also performed to update the Lagrange multipliers. The update of the Lagrange multipliers is unchanged from standard ADMM:

$$\lambda_{ik}^{(n+1)} = \lambda_{ik}^{(n)} + w_{ik}^{(n)} - \alpha Q_{ik}^{(n)}. \qquad (15)$$

The Hessian can also be updated during the optimization, which is analogous to updating a per-weight $\rho$. However, care should be taken that an entry of H does not go to zero, otherwise that weight will not be constrained. Moreover, if H is updated, then the Lagrange multipliers $\lambda$ also need to be updated, just as when $\rho$ is updated. This is because the Lagrange multipliers have been rescaled to absorb factors of $\rho$ and H in the ADMM penalty term expressed in Equation (14) above. The linear term in the ADMM loss is then given by:

$$L_{ADMM}^{linear} = \rho \lambda^T H(W - \alpha Q). \qquad (16)$$

The coefficient of the constraint on weight $w_{ik}$ is therefore $\rho \lambda_{ik} H_{ik,ik}$, and this is the true, unscaled, Lagrange multiplier for this constraint. This unscaled Lagrange multiplier should remain constant when updating $\rho \to \rho'$ and $H \to H'$. Therefore, if $\rho$ and H are updated, the scaled Lagrange multiplier must also be updated $\lambda \to \lambda'$ where:

$$\lambda'_{ik} = \frac{\rho H_{ik,ik}}{\rho' H'_{ik,ik}} \lambda_{ik}. \qquad (17)$$

The projection and dual update steps are applied less often than the proximal one. A sequence of iteration with only the proximal step applied, followed by an iteration in which all 3 steps are applied, is called a major iteration. In some embodiments, a major iteration has a fixed number of training epochs, chosen empirically. In other embodiments, the number of epochs is determined dynamically and can vary during the course of a training.

In some embodiments, after at least one major iteration, the Fisher Information Matrix H is re-calculated (e.g., using the gradients from the more recent training), and used in subsequent projection steps. The loss-aware projection is also applied, with sparsity driven by the importance of the weights. In addition, the dual-update step is performed taking into account the previous and the current values of H.

Figure 14:
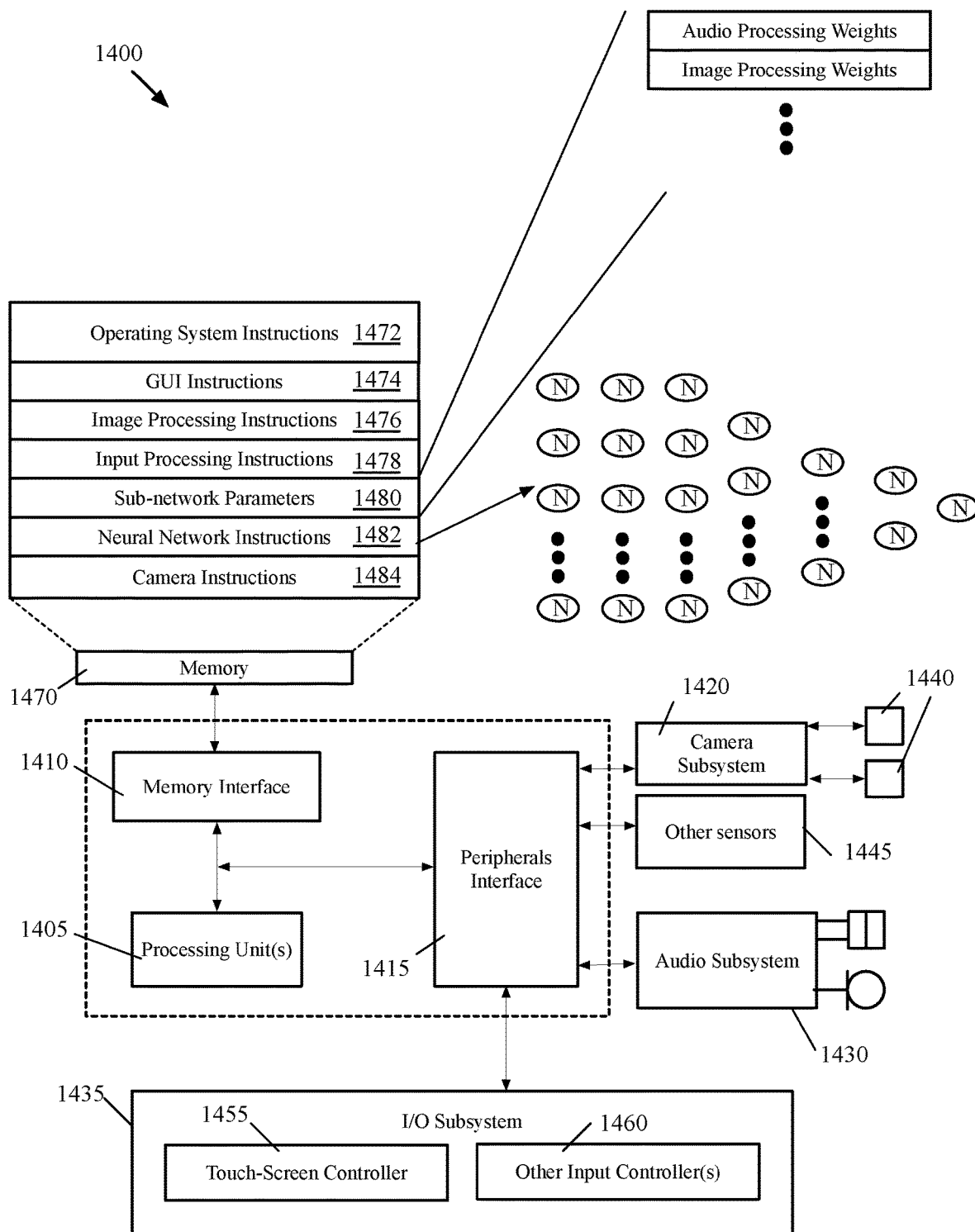
FIG. 14 illustrates an example of an architecture of a mobile computing device that stores neural network processing instructions, and multiple sub-networks that can be loaded into the processor for different purposes.

FIG. 14 is an example of an architecture 1400 of a mobile computing device that stores neural network processing instructions, and multiple sub-networks that can be loaded into the processor for different purposes. Examples of mobile computing devices include smartphones, tablets, laptops, etc. As shown, the mobile computing device 1400 includes one or more processing units 1405, a memory interface 1410 and a peripherals interface 1415. While a mobile device is shown in this example, many of these principles apply to other types of devices that use neural networks. An IOT device, for instance, might have fewer subsystems and fewer types of stored instructions, to perform its specific purpose and have the ability to receive a single type of input that is evaluated with its neural network.

The peripherals interface 1415 is coupled to various sensors and subsystems, including a camera subsystem 1420, an audio subsystem 1430, an I/O subsystem 1435, and other sensors 1445 (e.g., motion sensors), etc. The peripherals interface 1415 enables communication between the processing units 1405 and various peripherals. For example, an orientation sensor (e.g., a gyroscope) and an acceleration sensor (e.g., an accelerometer) can be coupled to the peripherals interface 1415 to facilitate orientation and acceleration functions. The camera subsystem 1420 is coupled to one or more optical sensors 1440 (e.g., a charged coupled device (CCD) optical sensor, a complementary metal-oxide-semiconductor (CMOS) optical sensor, etc.). The camera subsystem 1420 and the optical sensors 1440 facilitate camera functions, such as image and/or video data capturing.

The audio subsystem 1430 couples with a speaker to output audio (e.g., to output voice navigation instructions). Additionally, the audio subsystem 1430 is coupled to a microphone to facilitate voice-enabled functions, such as voice recognition (e.g., for searching), digital recording, etc. The I/O subsystem 1435 involves the transfer between input/output peripheral devices, such as a display, a touch screen, etc., and the data bus of the processing units 1405 through the peripherals interface 1415. The I/O subsystem 1435 includes a touch-screen controller 1455 and other input controllers 1460 to facilitate the transfer between input/output peripheral devices and the data bus of the processing units 1405. The touch-screen controller couples with a touch screen (not shown) to detect contact and movement on the touch screen using any of multiple touch sensitivity technologies. The other input controllers 1460 are coupled to other input/control devices, such as one or more buttons.

In some embodiments, the device includes wireless communication subsystem (not shown in FIG. 14) to establish wireless communication functions. In some embodiments, the wireless communication subsystem includes radio frequency receivers and transmitters, and/or optical receivers and transmitters. These receivers and transmitters of some embodiments are implemented to operate over one or more communication networks such as a GSM network, a Wi-Fi network, a Bluetooth network, etc.

The memory interface 1410 is coupled to memory 1470. In some embodiments, the memory 1470 includes volatile memory (e.g., high-speed random access memory), non-volatile memory (e.g., flash memory), a combination of volatile and non-volatile memory, and/or any other type of memory. As illustrated in FIG. 14, the memory 1470 stores an operating system (OS) 1472. The OS 1472 includes instructions for handling basic system services and for performing hardware dependent tasks.

The memory 1470 also stores various sets of instructions, including (1) graphical user interface instructions 1474 to facilitate graphic user interface processing; (2) image processing instructions 1476 to facilitate image-related processing and functions; (3) input processing instructions 1478 to facilitate input-related (e.g., touch input) processes and functions; and (4) camera instructions 1484 to facilitate camera-related processes and functions. The processing units 1405 execute the instructions stored in the memory 1470 in some embodiments.

In addition, the memory 1470 stores generic neural network instructions 1482, for implementing a machine-trained network of some embodiments of the invention. The memory also stores multiple sets of sub-network parameters 1480, including at least a set of weight values for an audio-processing network and a set of weight values for an image-processing network. These multiple sets of weights may be used by the processing units 1405 when executing the neural network instructions 1482 to perform a specific purpose (e.g., audio processing, image processing, etc.). If a larger number of the weight values for each network are 0, this simplifies the processing for each sub-network, as many of the edges (and possibly entire nodes) will effectively drop out.

The memory 1470 further stores communication instructions to facilitate communicating with one or more additional devices. The instructions described above are merely exemplary and the memory 1470 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

The memory 1470 may represent multiple different storages available on the device 1400. For example, in some embodiments, the memory 1470 includes processor registers, multiple levels of processor caches (e.g., the L0 micro-operations cache, L1 instruction cache, L1 data cache, etc.), main memory (e.g., RAM), disk storage, etc. In some embodiments, the use of a discrete set of 1-bit and 2-bit weight values enables the storage of multiple sets of sub-network parameters in a limited-storage device, and in some cases in the memory closest to the processing units 1405 in order to optimize the neural network processing. For instance, some embodiments store one or more sets of weight parameters 1480 in one of the levels of processor caches, so that the data is quickly accessible and does not need to be loaded onto the processor to evaluate an input.

While the components illustrated in FIG. 14 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 14 may be split into two or more integrated circuits.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 15 conceptually illustrates an electronic system 1500 with which some embodiments of the invention are implemented. The electronic system 1500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1525, and the permanent storage device 1535.

From these various memory units, the processing unit(s) 1510 retrieve instructions to execute and data to process in order to execute the processes of the invention. The processing unit(s) may be a single processor or a multi-core processor in different embodiments.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1525 is a read-and-write memory device. However, unlike storage device 1535, the system memory is a volatile read-and-write memory, such as random-access memory. The system memory stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieve instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, bus 1505 also couples electronic system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, at least one figure conceptually illustrates a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for configuring a machine-trained (MT) network comprising a plurality of nodes, wherein each node of a set of the nodes generates an output value based on received input values and a set of configurable weights, the method comprising:
propagating a set of inputs through the MT network to generate a set of outputs, each input having a corresponding expected output;
calculating a value of a loss function comprising (i) a first term that measures a difference between each generated output and its corresponding expected output and (ii) a second term that constrains the weights to quantized values for each weight and accounts for an increase in the first term due to quantization of the weights, wherein constraining the weights to the quantized values enables execution of the MT network on a particular type of neural network inference circuit that uses quantized weight values; and
using the calculated value of the loss function to train the weights of the MT network, wherein the MT network with the trained weights meets a set of requirements for execution by the particular type of neural network inference circuit.

2. The method of claim 1, wherein the second term of the loss function comprises a matrix with second-order partial derivatives of the loss function with respect to each weight of a plurality of the weights.

3. The method of claim 2 further comprising estimating the matrix by computing a first-order derivative of the loss function evaluated during a plurality of prior training iterations of the MT network.

4. The method of claim 3, wherein the matrix is a Hessian matrix, wherein estimating the matrix by computing the first order derivative comprises using an empirical Fisher (EF) approximation method to estimate diagonal values of the Hessian matrix.

5. The method of claim 2 further comprising estimating the matrix by using a natural gradient descent method.

6. The method of claim 5, wherein the matrix is a Hessian matrix, wherein the natural gradient descent method comprises using a true Fisher (TF) information matrix method.

7. The method of claim 1 further comprising determining the quantized values from a trained set of values for the set of weights obtained during prior training of the MT network that does not use the second term of the loss function.

8. The method of claim 7, wherein each node in the MT network belongs to one of a plurality of layers, wherein the quantized values comprise, for each respective layer of a set of the layers, a respective set of quantized values for weights associated with nodes belonging to the respective layer.

9. The method of claim 8, wherein determining particular quantized values for a particular layer from the trained set of values comprises calculating the variance of the trained values of weights associated with nodes belonging to the particular layer.

10. The method of claim 9, wherein the particular quantized values for the particular layer comprise (i) the value zero, (ii) the calculated variance of the trained values of weights associated with nodes belonging to the particular layer, and (iii) the negative of said calculated variance.

11. The method of claim 2, wherein:
each node in the MT network belongs to one of a plurality of layers;
the quantized values comprise, for each respective layer of a set of the layers, a respective set of quantized values for weights associated with nodes belonging to the respective layer; and
each respective set of quantized values comprises a respective positive value, a negation of the respective positive value, and the value zero.

12. The method of claim 11 further comprising, after using the calculated value of the loss function to train the weights, changing a subset of the weights frm the respective positive value for the weight or negation of the respective positive value for the weight to the value zero such that at least a threshold number of the weights are set to zero.

13. The method of claim 12, wherein the subset of weights the values of which am changed are selected based on a set of values in the matrix.

14. A non-transitory machine-readable medium storing a program which when executed by at least one processing unit configures a machine-trained (MT) network comprising a plurality of nodes, wherein each node of a set of the nodes generates an output value based on received input values and a set of configurable weights, the program comprising sets of instructions for:
propagating a set of inputs through the MT network to generate a set of outputs, each input having a corresponding expected output;
calculating a value of a loss function comprising (i) a first term that measures a difference between each generated output and its corresponding expected output and (ii) a second term that constrains the weights to quantized values for each weight and accounts for an increase in the first term due to quantizing the weights, wherein constraining the weights to the quantized values enables execution of the MT network on a particular type of neural network inference circuit that uses quantized weight values; and
using the calculated value of the loss function to train the weights of the MT network, wherein the MT network with the trained weights meets a set of requirements for execution by the particular type of neural network inference circuit.

15. The non-transitory machine-readable medium of claim 14, wherein the second term of the loss function comprises a matrix with second-order partial derivatives of the loss function with respect to each weight of a plurality of the weights.

16. The non-transitory machine-readable medium of claim 15, wherein:
the matrix is a Hessian matrix; and
the program further comprises a set of instructions for estimating diagonal values of the Hessian matrix by estimating first-order derivatives of the loss function evaluated during a plurality of prior training iterations of the MT network.

17. The non-transitory machine-readable medium of claim 15, wherein:
the matrix is a Hessian matrix; and
the program further comprises a set of instructions for estimating the Hessian matrix by using a true Fisher (TF) information matrix method that uses a natural gradient descent method.

18. The non-transitory machine-readable medium of claim 14, wherein:
- the program further comprises a set of instructions for determining the quantized values from a trained set of values for the set of weights obtained during prior training of the MT network that does not use the second term of the loss function;
- each node in the MT network belongs to one of a plurality of layers; and
- the quantized values comprise, for each respective layer of a set of the layers, a respective set of quantized values for weights associated with nodes belonging to the respective layer.

19. The non-transitory machine-readable medium of claim 18, wherein:
- the set of instructions for determining particular quantized values for a particular layer from the trained set of values comprises a set of instructions for calculating the variance of the trained values of weights associated with nodes belonging to the particular layer; and
- the particular quantized values for the particular layer comprise (i) the value zero, (ii) the calculated variance of the trained values of weights associated with nodes belonging to the particular layer, and (iii) the negative of said calculated variance.

20. The non-transitory machine-readable medium of claim 15, wherein:
- each node in the MT network belongs to one of a plurality of layers;
- the quantized values comprise, for each respective layer of a set of the layers, a respective set of quantized values for weights associated with nodes belonging to the respective layer; and
- each respective set of quantized values comprises a respective positive value, a negation of the respective positive value, and the value zero.

21. The non-transitory machine-readable medium of claim 20, wherein:
- the program further comprises a set of instructions for, after using the calculated value of the loss function to train the weights, changing a subset of the weights from the respective positive value for the weight or negation of the respective positive value for the weight to the value zero such that at least a threshold number of the weights are set to zero; and
- the subset of weights the values of which are changed are selected based on a set of values in the matrix.

22. The method of claim 8, wherein a first set of quantized values for weights associated with nodes belonging to a first layer is a different set of values than a second set of quantized values for weights associated with nodes belonging to a second layer.

23. The method of claim 22, wherein (i) the first set of quantized values comprises a first positive value, a negation of the first positive value, and the value zero and (ii) the second set of quantized values comprises a second positive value, a negation of the second positive value, and the value zero.

* * * * *